United States Patent
Goyal et al.

(10) Patent No.: US 10,880,045 B2
(45) Date of Patent: Dec. 29, 2020

(54) RETRANSMISSION AND NEW PACKET DETECTION IN WIRELESS SYSTEMS

(71) Applicant: QUALCOMM Incorporated, San Diego, CA (US)

(72) Inventors: Giriraj Goyal, Bangalore (IN); Vishal Agarwal, Ramnagar (IN); Nitin Raghavendra Kidiyoor, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 103 days.

(21) Appl. No.: 16/376,795

(22) Filed: Apr. 5, 2019

(65) Prior Publication Data

US 2020/0322092 A1   Oct. 8, 2020

(51) Int. Cl.
  *H04L 1/00* (2006.01)
  *H04L 1/16* (2006.01)
  *H04L 5/00* (2006.01)
  *H04L 12/801* (2013.01)

(52) U.S. Cl.
  CPC .......... *H04L 1/1621* (2013.01); *H04L 1/0061* (2013.01); *H04L 1/0072* (2013.01); *H04L 5/0055* (2013.01); *H04L 47/34* (2013.01)

(58) Field of Classification Search
  CPC ... H04L 1/0061; H04L 1/0072; H04L 1/1621; H04L 5/0055; H04L 47/34
  See application file for complete search history.

(56) References Cited

U.S. PATENT DOCUMENTS

| | | | | |
|---|---|---|---|---|
| 2019/0104424 A1* | 4/2019 | Hariharan | ................ | H04R 3/12 |
| 2019/0159002 A1* | 5/2019 | Huang | .................. | H04W 84/18 |
| 2019/0230459 A1* | 7/2019 | Sridharan | ................. | G06F 3/16 |

* cited by examiner

*Primary Examiner* — Brian P Cox

(74) *Attorney, Agent, or Firm* — Holland & Hart LLP/Qualcomm

(57) ABSTRACT

Methods, systems, and devices for wireless communications are described. Generally, the described techniques provide for sniffing, by a secondary wireless audio device, a first packet (including a first sequence number (SEQN) associated with a primary wireless audio device) from a source device to the primary wireless audio device. The secondary wireless audio device may increment a packet counter based on sniffing the first packet, and may receive a second packet (including a second SEQN associated with the secondary wireless audio device) from the source device. The secondary wireless audio device may transmit an acknowledgement (ACK) message corresponding to the second packet, and may increment its packet based thereon. In some examples, both the primary wireless audio device and the second wireless audio device may alternate between transmitting ACK messages for owned SEQNs.

20 Claims, 15 Drawing Sheets

RETRANSMISSION AND NEW PACKET DETECTION IN WIRELESS SYSTEMS

BACKGROUND

The following relates generally to wireless communications, and more specifically to retransmission and new packet detection in wireless systems.

In some examples, of a wireless communication system, a source device may transmit packets to a primary wireless audio device (e.g., a primary earbud), which may be sniffed by a secondary wireless audio device (e.g., a secondary earbud). The packets may have different formats and may correspond to different encryption procedures. In some examples, a packet received by the sniffing secondary wireless audio device may not correspond to the same packet counter for which the secondary wireless audio device has set the nonce for decryption. In some cases, the sniffing secondary wireless audio device may receive message integrity check (MIC) errors relatively frequently. In some cases, one MIC error caused by using a wrong packet counter to decrypt a packet from a particular sequence of packets may cause the MIC to fail for packets from subsequent packets.

In some examples, packets may be encrypted based at least in part on a packet counter value for the packets. Thus, decryption of the packet may also be based on the packet counter value. In some examples, the secondary wireless audio device may receive a packet out of sequence, causing the packet counter to go out of synchronization. In such examples, subsequent packets may be incorrectly decrypted by the secondary wireless audio device. If the packet counter becomes unsynchronized, effects of the wrong decryption may cascade to subsequent packets until a next synchronization procedure between the primary wireless audio device and the secondary wireless audio device. Conventional techniques for correcting incorrectly decrypted packets may require hardware support, or may become ineffective at avoiding cascading errors from wrong decryptions in some conditions.

SUMMARY

The described techniques relate to improved methods, systems, devices, and apparatuses that support retransmission and new packet detection in wireless systems. Generally, the described techniques provide for sniffing, by a secondary wireless audio device, a first packet (including a first sequence number (SEQN) associated with a primary wireless audio device) from a source device to the primary wireless audio device. The secondary wireless audio device may also increment a packet counter from a first packet counter value to a second packet counter value, based on sniffing the first packet, and may receive a second packet (including a second SEQN associated with the secondary wireless audio device) from the source device. The secondary wireless audio device may transmit an acknowledgement (ACK) message corresponding to the second packet, and may increment its packet from the second packet counter value to a third packet counter value based thereon. In some examples, both the primary wireless audio device and the second wireless audio device may alternate between transmitting ACK messages for owned SEQNs, such that a primary wireless audio device may transmit an ACK message for a first SEQN and a secondary wireless audio device may transmit an ACK message for a second SEQN. In some cases, a wireless audio device may miss a sniffed packet, and may fail to decrypt a next received packet (e.g., due to a misaligned packet counter value). The wireless audio device may send a negative acknowledgement (NACK) message, increment its packet counter value, and then successfully receive the retransmission of the failed packet.

A method of wireless communications including is described. The method may include sniffing, by a secondary wireless audio device, a first packet from a source device to a primary wireless audio device, the first packet including a first SEQN associated with the primary wireless audio device, incrementing, by the secondary wireless audio device, a packet counter from a first packet counter value to a second packet counter value, based on sniffing the first packet, receiving, by the secondary wireless audio device, a second packet from the source device to the primary wireless audio device, the second packet including a second SEQN associated with the secondary wireless audio device, transmitting to the source device, based on the second SEQN, an ACK message corresponding to the second packet, and incrementing the packet counter, based on the ACK message, from the second packet counter value to a third packet counter value.

An apparatus for wireless communications including is described. The apparatus may include a processor, memory in electronic communication with the processor, and instructions stored in the memory. The instructions may be executable by the processor to cause the apparatus to sniff, by a secondary wireless audio device, a first packet from a source device to a primary wireless audio device, the first packet including a first SEQN associated with the primary wireless audio device, increment, by the secondary wireless audio device, a packet counter from a first packet counter value to a second packet counter value, based on sniffing the first packet, receive, by the secondary wireless audio device, a second packet from the source device to the primary wireless audio device, the second packet including a second SEQN associated with the secondary wireless audio device, transmit to the source device, based on the second SEQN, an ACK message corresponding to the second packet, and increment the packet counter, based on the ACK message, from the second packet counter value to a third packet counter value.

Another apparatus for wireless communications including is described. The apparatus may include means for sniffing, by a secondary wireless audio device, a first packet from a source device to a primary wireless audio device, the first packet including a first SEQN associated with the primary wireless audio device, incrementing, by the secondary wireless audio device, a packet counter from a first packet counter value to a second packet counter value, based on sniffing the first packet, receiving, by the secondary wireless audio device, a second packet from the source device to the primary wireless audio device, the second packet including a second SEQN associated with the secondary wireless audio device, transmitting to the source device, based on the second SEQN, an ACK message corresponding to the second packet, and incrementing the packet counter, based on the ACK message, from the second packet counter value to a third packet counter value.

A non-transitory computer-readable medium storing code for wireless communications including is described. The code may include instructions executable by a processor to sniff, by a secondary wireless audio device, a first packet from a source device to a primary wireless audio device, the first packet including a first SEQN associated with the primary wireless audio device, increment, by the secondary wireless audio device, a packet counter from a first packet counter value to a second packet counter value, based on sniffing the first packet, receive, by the secondary wireless audio device, a second packet from the source device to the primary wireless audio device, the second packet including a second SEQN associated with the secondary wireless audio device, transmit to the source device, based on the second SEQN, an ACK message corresponding to the second packet, and increment the packet counter, based on the ACK message, from the second packet counter value to a third packet counter value.

Some examples of the method, apparatuses, and non-transitory computer-readable medium described herein may further include operations, features, means, or instructions for decrypting the first packet based on the first packet counter value, and decrypting the second packet based on the second packet counter value.

Some examples of the method, apparatuses, and non-transitory computer-readable medium described herein may further include operations, features, means, or instructions for monitoring for a third packet sent from the source device to the primary wireless audio device, the third packet having the first SEQN, determining, based on the monitoring, that the third packet may have not been successfully sniffed by the secondary wireless audio device, and receiving a fourth packet sent from the source device to the primary wireless audio device, the fourth packet having the second SEQN.

Some examples of the method, apparatuses, and non-transitory computer-readable medium described herein may further include operations, features, means, or instructions for decrypting the fourth packet based on the third packet counter value, identifying a message integrity check (MIC) error based on the decrypting, transmitting, based on the MIC error, a NACK message to the source device, and incrementing the packet counter, based on the NACK message, from the third packet counter value to a fourth packet counter value.

Some examples of the method, apparatuses, and non-transitory computer-readable medium described herein may further include operations, features, means, or instructions for receiving, based on the NACK message, a retransmission of the fourth packet, the fourth packet having the second SEQN, decrypting the fourth packet based on the fourth packet counter value, transmitting, to the source device based on the second SEQN, an ACK message corresponding to the fourth packet, and incrementing the packet counter, based on the ACK message, from the fourth packet counter value to a fifth packet counter value.

Some examples of the method, apparatuses, and non-transitory computer-readable medium described herein may further include operations, features, means, or instructions for identifying a first nonce value that may be set based on the first packet counter value and a second nonce value based on the second packet counter value, and decrypting the first packet using the first nonce value based on the first SEQN.

Some examples of the method, apparatuses, and non-transitory computer-readable medium described herein may further include operations, features, means, or instructions for identifying, based on incrementing the packet counter from the first packet counter value to the second packet counter value, the second nonce value that may be set based on the second packet counter value and a third nonce value that may be set based on the third packet counter value, decrypting the second packet using the second nonce value based on the second SEQN, and identifying, based on incrementing the packet counter from the second packet counter value to the third packet counter value, the third nonce value that may be set based on the second packet counter value and a fourth nonce value that may be set based on a fourth packet counter value.

Some examples of the method, apparatuses, and non-transitory computer-readable medium described herein may further include operations, features, means, or instructions for monitoring for a third packet sent from the source device to the primary wireless audio device, the third packet having the first SEQN, determining, based on the monitoring, that the third packet may have not been successfully sniffed by the secondary wireless audio device, receiving a fourth packet sent from the source device to the primary wireless audio device, the fourth packet having the second SEQN, and decrypting the fourth packet using the fourth nonce value based on the second SEQN.

Some examples of the method, apparatuses, and non-transitory computer-readable medium described herein may further include operations, features, means, or instructions for incrementing the packet counter, based on decrypting the fourth packet, from the third packet counter value to a fifth packet counter value, identifying, based on incrementing the packet counter from the fourth packet counter value to the fifth packet counter value, a fifth nonce value set based on the fifth packet counter value, and a sixth nonce value that may be set based on a sixth packet counter value, and sniffing a fifth packet sent form the source device to the primary wireless audio device based on one of the fifth nonce value or the sixth nonce value.

Some examples of the method, apparatuses, and non-transitory computer-readable medium described herein may further include operations, features, means, or instructions for comparing, by the secondary wireless audio device, a number of message integrity check (MIC) errors for a data packet stream between the source device and the primary wireless audio device to a threshold number of MIC errors, determining, based on the comparing, that the number of MIC errors satisfies the threshold number of MIC errors, and terminating communication with the source device based on the comparing and the determining.

Some examples of the method, apparatuses, and non-transitory computer-readable medium described herein may further include operations, features, means, or instructions for transmitting, to the primary wireless audio device, a link termination message indicating the number of MIC errors for the data stream between the source device and the primary wireless audio device.

A method of wireless communications including is described. The method may include receiving, by a secondary wireless audio device, a first link management protocol message from a source device to a primary wireless audio device, receiving, from the primary wireless audio device, an indication that the primary wireless audio device has received the first link management protocol message from the source device, transmitting, to the primary wireless audio device, a first acknowledgement message for the indication, receiving, from the source device, a retransmission of the first link management protocol message, incrementing, by the secondary wireless audio device, a packet counter based on the retransmission of the first link management protocol message, and transmitting, to the source device, an acknowledgement message for the retransmission of the first link management protocol message.

An apparatus for wireless communications including is described. The apparatus may include a processor, memory in electronic communication with the processor, and instructions stored in the memory. The instructions may be executable by the processor to cause the apparatus to receive, by a secondary wireless audio device, a first link management protocol message from a source device to a primary wireless audio device, receive, from the primary wireless audio device, an indication that the primary wireless audio device has received the first link management protocol message from the source device, transmit, to the primary wireless audio device, a first acknowledgement message for the indication, receive, from the source device, a retransmission of the first link management protocol message, increment, by the secondary wireless audio device, a packet counter based on the retransmission of the first link management protocol message, and transmit, to the source device, an acknowledgement message for the retransmission of the first link management protocol message.

Another apparatus for wireless communications including is described. The apparatus may include means for receiving, by a secondary wireless audio device, a first link management protocol message from a source device to a primary wireless audio device, receiving, from the primary wireless audio device, an indication that the primary wireless audio device has received the first link management protocol message from the source device, transmitting, to the primary wireless audio device, a first acknowledgement message for the indication, receiving, from the source device, a retransmission of the first link management protocol message, incrementing, by the secondary wireless audio device, a packet counter based on the retransmission of the first link management protocol message, and transmitting, to the source device, an acknowledgement message for the retransmission of the first link management protocol message.

A non-transitory computer-readable medium storing code for wireless communications including is described. The code may include instructions executable by a processor to receive, by a secondary wireless audio device, a first link management protocol message from a source device to a primary wireless audio device, receive, from the primary wireless audio device, an indication that the primary wireless audio device has received the first link management protocol message from the source device, transmit, to the primary wireless audio device, a first acknowledgement message for the indication, receive, from the source device, a retransmission of the first link management protocol message, increment, by the secondary wireless audio device, a packet counter based on the retransmission of the first link management protocol message, and transmit, to the source device, an acknowledgement message for the retransmission of the first link management protocol message.

Some examples of the method, apparatuses, and non-transitory computer-readable medium described herein may further include operations, features, means, or instructions for receiving a second link management protocol message from the source device to the primary wireless audio device, monitoring for a threshold amount of time for an indication that the primary wireless audio device may have received the second link management protocol message from the source device, receiving, after the threshold amount of time may have expired, a first retransmission of the second link management protocol message from the source device to the primary wireless audio device, and incrementing, by the secondary wireless audio device, the packet counter based on the first retransmission of the second link management protocol message.

Some examples of the method, apparatuses, and non-transitory computer-readable medium described herein may further include operations, features, means, or instructions for receiving, from the primary wireless audio device, an indication that the primary wireless audio device may have received the retransmission of the second link management protocol message from the source device, transmitting, to the primary wireless audio device, a second acknowledgement message for the indication, receiving, from the source device, a second retransmission of the second link management protocol message, refraining from incrementing the packet counter based on the second retransmission of the second link management protocol message, and transmitting, to the source device, an acknowledgement message for the second retransmission of the second link management protocol message.

DETAILED DESCRIPTION

Figure 1:
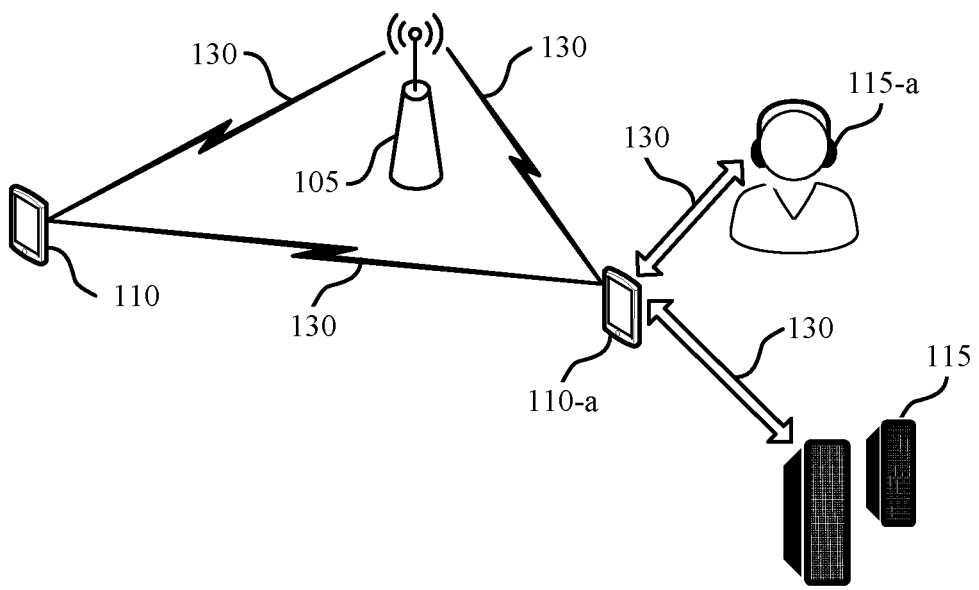
FIG. 1 illustrates an example of a system for wireless communication system that supports retransmission and new packet detection in wireless systems in accordance with aspects of the present disclosure.

In some examples, of a wireless communication system, a source device may transmit packets to a primary wireless audio device (e.g., a primary earbud), which may be sniffed by a secondary wireless audio device (e.g., a secondary earbud). The packets may have different formats and may correspond to different encryption procedures. In some examples, a packet received by the sniffing secondary wireless audio device may not correspond to the same packet counter for which the secondary wireless audio device has set the nonce for decryption. In some cases, the sniffing secondary wireless audio device may receive message integrity check (MIC) errors relatively frequently. In some cases, one MIC error caused by using a wrong packet counter to decrypt a packet from a particular sequence of packets may cause the MIC to fail for packets from subsequent packets.

In some examples, packets may be encrypted based at least in part on a packet counter value for the packets. Thus, decryption of the packet may also be based on a packet counter value. In some examples, the secondary wireless audio device may receive a packet out of sequence, causing the packet counter to go out of synchronization. In such examples, subsequent packets may be incorrectly decrypted by the secondary wireless audio device. If the packet counter becomes unsynchronized, effects of the wrong decryption may cascade to subsequent packets until a next synchronization procedure between the primary wireless audio device and the secondary wireless audio device. Conventional techniques for correcting incorrectly decrypted packets may require hardware support, or may become ineffective at avoiding cascading errors from wrong decryptions in some conditions.

The described techniques relate to improved methods, systems, devices, and apparatuses that support retransmission and new packet detection in wireless systems. Generally, the described techniques provide for sniffing, by a secondary wireless audio device, a first packet (including a first sequence number (SEQN) associated with a primary wireless audio device) from a source device to the primary wireless audio device. The secondary wireless audio device may also increment a packet counter from a first packet counter value to a second packet counter value, based on sniffing the first packet, and may receive a second packet (including a second SEQN associated with the secondary wireless audio device) from the source device. The secondary wireless audio device may transmit an acknowledgement (ACK) message corresponding to the second packet, and may increment its packet from the second packet counter value to a third packet counter value based thereon. In some examples, both the primary wireless audio device and the second wireless audio device may alternate between transmitting ACK messages for owned SEQNs, such that a primary wireless audio device may transmit an ACK message for a first SEQN and a secondary wireless audio device may transmit an ACK message for a second SEQN. In some cases, a wireless audio device may miss a sniffed packet, and may fail to decrypt a next received packet (e.g., due to a misaligned packet counter value). The wireless audio device may send a negative acknowledgement (NACK) message, increment its packet counter value, and then successfully receive the retransmission of the failed packet.

Aspects of the disclosure are initially described in the context of a wireless communication system. Aspects of the disclosure are further illustrated by and described with reference to timelines and flow charts. Aspects of the disclosure are further illustrated by and described with reference to apparatus diagrams, system diagrams, and flowcharts that relate to retransmission and new packet detection in wireless systems.

FIG. 1 illustrates a wireless communication system 100 (e.g., which may include to refer to or include a wireless personal area network (PAN), a wireless local area network (WLAN), a Wi-Fi network) configured in accordance with various aspects of the present disclosure. The wireless communication system 100 may include an AP 105, devices (e.g., source devices 110), and paired devices (e.g., wireless audio devices 115) implementing WLAN communications (e.g., Wi-Fi communications) and/or Bluetooth communications. For example, source devices 110 may include cell phones, mobile stations, personal digital assistant (PDAs), other handheld devices, netbooks, notebook computers, tablet computers, laptops, or some other suitable terminology. Paired devices (e.g., wireless audio devices 115) may include Bluetooth devices capable of pairing with other Bluetooth devices (e.g., such as source devices 110), which may include wireless headsets, wireless audio devices, ear pieces, headphones, display devices (e.g., TVs, computer monitors), microphones, meters, valves, etc.

Bluetooth communications may refer to a short-range communication protocol and may be used to connect and exchange information between source devices 110 and wireless audio devices 115 (e.g., between mobile phones, computers, digital cameras, wireless headsets, wireless audio devices, keyboards, mice or other input peripherals, and similar devices). Bluetooth systems (e.g., aspects of wireless communication system 100) may be organized using a master-slave relationship employing a time division duplex protocol having, for example, defined time slots of 625 mu secs, in which transmission alternates between the master device (e.g., a source device 110) and one or more slave devices (e.g., paired devices such as wireless audio devices 115). In some cases, a source device 110 may generally refer to a master device, and a wireless audio device 115 may refer to a slave device in a PAN. As such, in some cases, a device may be referred to as either a source device 110 or a wireless audio device 115 based on the Bluetooth role configuration of the device. That is, designation of a device as either a source device 110 or a wireless audio device 115 may not necessarily indicate a distinction in device capability, but rather may refer to or indicate roles held by the device in the PAN. Generally, source device 110 may refer to a wireless communication device capable of wirelessly exchanging data signals with another device, and wireless audio device 115 may refer to a device operating in a slave role, or to a short-range wireless device capable of exchanging data signals with the mobile device (e.g., using Bluetooth communication protocols).

A Bluetooth device may be compatible with certain Bluetooth profiles to use desired services. A Bluetooth profile may refer to a specification regarding an aspect of Bluetooth-based wireless communications between devices. That is, a profile specification may refer to a set of instructions for using the Bluetooth protocol stack in a certain way, and may include information such as suggested user interface formats, particular options and parameters at each layer of the Bluetooth protocol stack, etc. For example, a Bluetooth specification may include various profiles that define the behavior associated with each communication endpoint to implement a specific use case. Profiles may thus generally be defined according to a protocol stack that promotes and allows interoperability between endpoint devices from different manufacturers through enabling applications to discover and use services that other nearby Bluetooth devices may be offering. The Bluetooth specification defines device role pairs that together form a single use case called a profile. One example profile defined in the Bluetooth specification is the Handsfree Profile (HFP) for voice telephony, in which one device implements an Audio Gateway (AG) role and the other device implements a Handsfree (HF) device role. Another example is the Advanced Audio Distribution Profile (A2DP) for high-quality audio streaming, in which one device (e.g., source device 110-*a*) implements an audio source device (SRC) role and another device (e.g., wireless audio device 115) implements an audio sink device (SNK) role.

For a commercial Bluetooth device that implements one role in a profile to function properly, another device that implements the corresponding role must be present within the radio range of the first device. For example, in order for an HF device such as a Bluetooth headset to function according to the Handsfree Profile, a device implementing the AG role (e.g., a cell phone) must be present within radio range. Likewise, in order to stream high-quality mono or stereo audio according to the A2DP, a device implementing the SNK role (e.g., Bluetooth headphones or Bluetooth wireless audio devices) must be within radio range of a device implementing the SRC role (e.g., a stereo music player).

The Bluetooth specification defines a layered data transport architecture and various protocols and procedures to handle data communicated between two devices that implement a particular profile use case. For example, various logical links are available to support different application data transport requirements, with each logical link associated with a logical transport having certain characteristics (e.g., flow control, acknowledgement/repeat mechanisms, sequence numbering, scheduling behavior, etc.). The Bluetooth protocol stack is split in two parts: a "controller stack" containing the timing critical radio interface, and a "host stack" dealing with high level data. The controller stack is generally implemented in a low-cost silicon device containing the Bluetooth radio and a microprocessor. The controller stack may be responsible for setting up communication links 130 such as asynchronous connection-less (ACL) links, synchronous connection orientated (SCO) links, etc. Further, the controller stack may implement link management protocol (LMP) functions, low energy link layer (LE LL) functions, etc. The host stack is generally implemented as part of an operating system, or as an installable package on top of an operating system. The host stack may be responsible for logical link control and adaptation protocol (L2CAP) functions, Bluetooth network encapsulation protocol (BNEP) functions, service discovery protocol (SDP) functions, etc. In some cases, the controller stack and the host stack may communicate via a host controller interface (HCI). In other cases, (e.g., for integrated devices such as Bluetooth headsets), the host stack and controller stack may be run on the same microprocessor to reduce mass production costs. For such "hostless systems," the HCI may be optional, and may be implemented as an internal software interface.

A communication link 130 established between two Bluetooth devices (e.g., between a source device 110-a and a wireless audio device 115-a) may provide for communications or services (e.g., according to some Bluetooth profile). For example, a Bluetooth connection may be an extended synchronous connection orientated (eSCO) link for voice call (e.g., which may allow for retransmission), an ACL link for music streaming (e.g., A2DP), etc. For example, eSCO packets may be transmitted in predetermined time slots (e.g., 6 Bluetooth slots each for eSCO). The regular interval between the eSCO packets may be specified when the Bluetooth link is established. The eSCO packets to/from a specific slave device (e.g., wireless audio device 115-a) are acknowledged, and may be retransmitted if not acknowledged during a retransmission window. In addition, audio may be streamed between the source device 110-a and wireless audio device 115-a using an ACL link (A2DP profile). In some cases, the ACL link may occupy 1, 3, or 5 Bluetooth slots for data or voice. Other Bluetooth profiles supported by Bluetooth devices may include Bluetooth Low Energy (BLE) (e.g., providing considerably reduced power consumption and cost while maintaining a similar communication range), human interface device profile (HID) (e.g., providing low latency links with low power requirements), etc.

In some cases, a device may be capable of both Bluetooth and WLAN communications. For example, WLAN and Bluetooth components may be co-located within a device, such that the device may be capable of communicating according to both Bluetooth and WLAN communication protocols, as each technology may offer different benefits or may improve user experience in different conditions. In some cases, Bluetooth and WLAN communications may share a same medium, such as the same unlicensed frequency medium. In such cases, a source device 110 may support WLAN communications via AP 105, which may include communicating over communication links 130 (e.g., WLAN communication links). The AP 105 and the associated source devices 110 may represent a basic service set (BSS) or an extended service set (ESS). The various source devices 110 in the network may be able to communicate with one another through the AP 105. In some cases, the AP 105 may be associated with a coverage area, which may represent a basic service area (BSA).

Source devices 110 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within wireless communication system 100, and devices may communicate with each other via communication links 130 (e.g., peer-to-peer communication links). AP 105 may be coupled to a network, such as the Internet, and may enable a source device 110 to communicate via the network (or communicate with other source devices 110 coupled to the AP 105). A source device 110 may communicate with a network device bi-directionally. For example, in a WLAN, a source device 110 may communicate with an associated AP 105 via downlink (e.g., the communication link from the AP 105 to the source device 110) and uplink (e.g., the communication link from the source device 110 to the AP 105).

In some examples, content, media, audio, etc. exchanged between a source device 110 and a wireless audio device 115 may originate from a WLAN. For example, in some cases, source device 110-a may receive audio from an AP 105 (e.g., via WLAN communications), and the source device 110-a may then implement the described techniques to relay or pass the audio to the wireless audio device 115-a (e.g., via Bluetooth communications). In some cases, certain types of Bluetooth communications (e.g., such as high quality or high definition (HD) Bluetooth) may require enhanced quality of service. For example, in some cases, delay-sensitive Bluetooth traffic may have higher priority than WLAN traffic.

In some examples, as described in greater detail with respect to FIGS. 2A and 2B, a source device 110-a may be referred to as a source device 110-a, and a wireless audio device 115-a may be referred to as a primary wireless audio device or a secondary wireless audio device. That is, a primary wireless audio device 115-a may be in direct communication with a source device 110-a, and a secondary wireless audio device 115-*a* may sniff communications between source device 110-*a* and primary wireless audio device 115-*a*.

Generally, the described techniques provide for sniffing, by a secondary wireless audio device 115, a first packet (including a first sequence number (SEQN) associated with a primary wireless audio device 115) from a source device 110 to the primary wireless audio device 115. The second wireless audio device 115 may also increment a packet counter from a first packet counter value to a second packet counter value, based on sniffing the first packet, and may receive a second packet (including a second SEQN associated with the secondary wireless audio device) from the source device 110. The second wireless audio device 115 may transmit an acknowledgement (ACK) message corresponding to the second packet, and may increment its packet from the second packet counter value to a third packet counter value based thereon. In some examples, both the first wireless audio device and the second wireless audio device may alternate between transmitting ACK messages for owned SEQNs, such that a first wireless audio device 115 may transmit an ACK message for a first SEQN and a second wireless audio device 115 may transmit an ACK message for a second SEQN. In some cases, a wireless audio device 115 may miss a sniffed packet, and may fail to decrypt a next received packet (e.g., due to a misaligned packet counter value). The wireless audio device 115 may send a negative acknowledgement (NACK) message, increment its packet counter value, and then successfully receive the retransmission of the failed packet.

Figure 2:
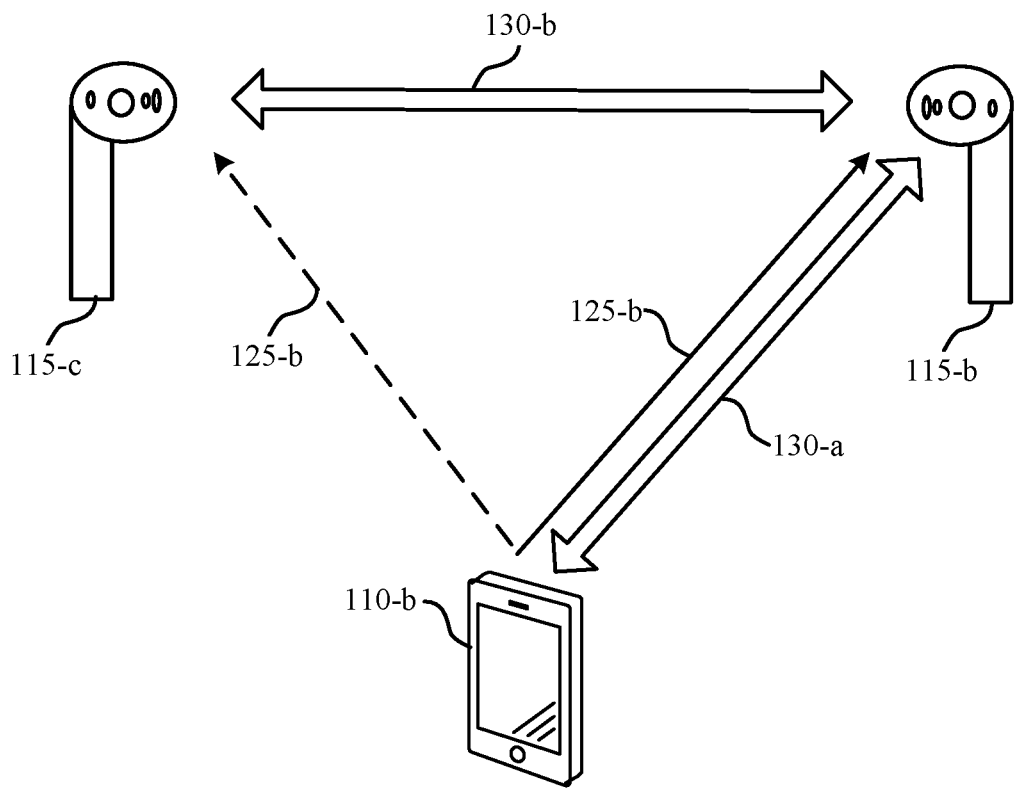
FIG. 2 illustrates an example of a wireless communication system that supports retransmission and new packet detection in wireless systems in accordance with aspects of the present disclosure.

FIG. 2 illustrates an example of a wireless communication system 200 that supports retransmission and new packet detection in wireless systems in accordance with aspects of the present disclosure. In some examples, wireless communication system 200 may implement aspects of wireless communication system 100.

Wireless communication system 200 may include a wireless device such as a source device 110-*b*, a first wireless audio device 115-*b*, and a second wireless audio device 115-*c*. In some examples, source device 110-*b* may communicate with first wireless audio device 115-*c* via a communication link 130-*a*. Source device 110-*b* may transmit voice data 125-*b* to first wireless audio device 115-*b*. In some examples, first wireless audio device 115-*b* may establish a communication link 130-*b* (e.g., a control link) with second wireless audio device 115-*c*. First wireless audio device 115-*b* and second wireless audio device 115-*c* may communicate (e.g., perform synchronization procedures) via communication link 130-*b*.

In some examples, first wireless audio device 115-*b* may provide second wireless audio device 115-*c* with information, or may perform connection or synchronization procedures via communication link 130-*b*. Second wireless audio device 115-*c* may perform Bluetooth sniffing procedures based on the information received via communication link 130-*b*, and may receive audio data (e.g., voice data 125-*b*) that is sent from wireless source device 110-*b* to first wireless audio device 115-*b*.

In some examples of a wireless communication system 200, source device 110-*b* may transmit packets to first wireless audio device 115-*b* which may be sniffed by second wireless audio device 115-*c*. The packets may have different formats and may correspond to different encryption procedures. In some examples, a packet received by the sniffing second wireless audio device 115-*c* may not correspond to the same packet counter for which the second wireless audio device has set the nonce for decryption. In some cases, the sniffing second wireless audio device 115-*c* (e.g., secondary earbud) may receive message integrity check (MIC) errors relatively frequently. In some cases, one MIC error caused by using a wrong packet counter to decrypt a packet from a particular sequence of packets may cause the MIC to fail for packets from subsequent sequences.

In some examples, packets may be encrypted based at least in part on a packet counter. Thus, decryption of the packet may also be based on a packet counter. In some examples, second wireless audio device 115-*c* may receive a packet out of sequence, causing the packet counter to go out of synchronization. In such examples, subsequent packets may be incorrectly decrypted by second wireless audio device 115-*c*. If the packet counter goes wrong once beyond a correction, effects of the wrong decryption may cascade to subsequent packets until a next synchronization procedure between first wireless audio device 115-*b* and second wireless audio device 115-*c*. In some examples, correcting incorrectly decrypted packets may require hardware support. Some techniques for aligning packet counters during run time may provide some degree of accuracy, but may become ineffective at avoiding cascading errors from wrong decryptions in some conditions (e.g., degrading connection or communication). In some examples, these complex side-effects may be addressed by hardware-based solutions.

In some examples, techniques (e.g., software-based mechanisms) may be used to reduce the complex side-effects and address the above described problems related to the packet counter alignment and incorrectly decrypted packets. Primary wireless audio device 115-*b* and secondary wireless audio device 115-*c* may take turns sending acknowledgment (ACK) packets to the source device 110-*b*. For example, primary wireless audio device 115-*b* may own a first sequence number (SEQN) and secondary wireless audio device 115-*c* may own a second SEQN. Primary wireless audio device 115-*b* may send an ACK message upon receiving a packet with the first SEQN (e.g., SEQN 0), and may sniff packets that have the second SEQN (e.g., SEQN 1). Secondary wireless audio device 115-*c* may send an ACK message upon receiving a packet with the second SEQN, and may sniff packets that have the first SEQN.

In some examples, there may be more SEQNs than devices. In such examples, each device may own more than one SEQN. For instance, if 10 packets cycle through 10 SEQNs (e.g., SEQNs 0 through 9, where the 11th packet reuses SEQN 0), and there are two devices (e.g., primary wireless audio device 115-*b* and secondary wireless audio device 115-*c*), then primary wireless audio device 115-*b* may own SEQNs 0, 2, 4, 6, and 8, and secondary wireless audio device 115-*c* may own SEQNs 1, 3, 5, and 9. Lost packets may refer to packets which hare unheard completely or are received by a device with a cyclic redundancy check (CRC) error (e.g., including from retransmissions). In some examples, a device may be able to lose no more than one packet in a row (e.g., lose a non-owned SEQN).

In some examples, a device (e.g., primary wireless audio device 115-*b* or secondary wireless audio device 115-*c*) may be capable of setting a single nonce. In such examples, when the device loses a sniffing SEQN (e.g., a non-owned SEQN) it may send a MIC error message for the next packet (e.g., an owned SEQN) because of the wrong packet counter or a genuine MIC error. MIC errors due to retransmissions may be avoided by differentiating new packets from retransmissions (e.g., using one or more hashes based on MIC octets, CRC octets, or the like). In such examples, the device may increment its packet counter once and send a negative acknowledgement (NACK) message for the packet. On reception of the retransmissions, the device may decrypt the packet correctly (e.g., based on the incremented packet counter). If another MIC error occurs, then the device may proceed to address a genuine MIC error.

In some examples, a device (e.g., primary wireless audio device 115-*b* or secondary wireless audio device 115-*c*) may be capable of setting multiple nonces (e.g., two nonces). In such examples, when the device loses a sniffing SEQN (e.g., a non-owned SEQN) it may be able to decrypt the next packet (e.g., an owned SEQN) correctly based on the second nonce value. Thus, the device may have no need to recover a lost packet (e.g., during a synchronization procedure), and the packet counter may maintain alignment with each reception ever after the packet loss. Primary wireless audio device 115-*b* may be a single-nonce or a double nonce device, secondary wireless audio device 115-*c* may be a single-nonce or a double nonce device, and one of the two devices may be a single-nonce device and the other may be a double-nonce device.

In some examples, a source device 110-*b* may send a link management protocol (LMP) packet to a primary wireless audio device 115-*b*, and primary wireless audio device 115-*b* may process the LMP packet. When a secondary wireless audio device 115-*c* receives an LMP packet (e.g., owns the SEQN of the LMP packet), it may be beneficial to ensure that the primary wireless audio device 115-*b* has not lost the packet. In such examples, the secondary wireless audio device 115-*c* may refrain from acknowledging the LMP packet until it receives confirmation (e.g., an LMP ACK message) from the primary wireless audio device 115-*b* indicating that the primary wireless audio device 115-*b* has received the LMP having the SEQN owned by the secondary wireless audio device 115-*c*. Primary wireless audio device 115-*b* may immediately (in a subsequent or immediately following transmission time interval (TTI)) inform the secondary wireless audio device 115-*c* upon receiving an LMP with a SEQN owned by the secondary wireless audio device 115-*c*.

In some examples, a secondary wireless audio device 115-*c* may receive repeated MIC errors. If the number of MIC errors satisfies (e.g., reaches or exceeds) a threshold number, then the secondary wireless audio device 115-*c* may terminate communication with the source device 110-*b*. Then, the secondary wireless audio device 115-*c* may inform the primary wireless audio device 115-*b* of the repeated MIC errors a next opportunity for communication (e.g., during a synchronization procedure). The primary wireless audio device 115-*b* may terminate the link, based on the received information. In examples where the secondary wireless audio device 115-*c* is capable of setting a single nonce, one MIC error may occur after missing a sniffing SEQN. The threshold value for a secondary wireless audio device 115-*b* to terminate communication with the source device 110-*b* may be one more as compared to that of a double nonce wireless audio device threshold.

In some examples, the SEQN of a received packet may match the SEQN of a last received packet. The receiving device may determine whether the packet is a new packet subsequent to a lost packet, or a retransmission of a previous packet. In some examples, the receiving device (e.g., primary wireless audio device 115-*b* or secondary wireless audio device 115-*c*) may determine whether one or more attributes from the two packets match, or whether hashes generated based on the one or more attributes. For instance, the device may determine whether CRC octets of the first and second received packets match. For unencrypted or AES-CCM encrypted links the CRC octets may be used as received. For E0 encrypted packets, the CC octets may be matched after decryption. The device may determine whether MIC octets of the first and second received packets match. IN cases of AES-CCM encrypted links, the device may use the MIC octets as received (e.g., prior to decryption). In some examples, the device may determine whether a packet type, or payload length of the first and second packet match (e.g., for unencrypted or E0 encrypted packets, because decryption is not based on the packet counter in such examples).

In addition to attribute matching, double nonce devices may also make use of MIC results to determine if a packet having the same SEQN as a previous packet is a retransmission or a new packet subsequent to a missed SEQN. If the attributes do not match, or if the attributes match and the MIC passes, then the packet may reliably be classified as a new packet. Otherwise, the second packet may be a retransmission. Some examples may include implementation specific hash octets calculated on received payloads of unencrypted packets, E0 encrypted packets after decryption, or AES CCM encrypted packets before decryption. In some examples, the link between the source device 110-*b* and the primary wireless audio device 115-*b* may not be encrypted using AES-CCM. In such examples, the attributes of the two packets may match due because they have the same content, and a valid new packet may be discarded. Instead, when the link is not AES CCM encrypted, wireless audio devices may operate in normal mode (e.g. not in alternative ACK mode where each device owns one or a set of SEQNs) where al packets are owned by the primary wireless audio device 115-*b* and sniffed by the secondary wireless audio device 115-*c*.

In some examples, lost packets may be retrieved during a synchronization period. Each wireless audio device may inform the other wireless audio device of missed or lost packets, and the other wireless audio device may relay the missed packet or packets. During a synchronization between first wireless audio device 115-*b* and second wireless audio device 115-*c*, both devices may relay missed packets by: telling each other the missing packet counter values, using a selective relay mechanism, or the like.

An advantage of the described techniques may be reduced or eliminated need for recovering incorrectly decrypted packets and eliminating the issue of packet counter alignment completely. The described techniques may be implemented with software that does not required hardware change. The described techniques may not impose a condition that both devices be single nonce devices, or both be double nonce devices. Further, selective relay at synchronization may be simple because both devices know the missing packet counters and can get the missed packets relayed by sharing this information with each other.

In some examples, the secondary wireless audio device 115-*c* may listen to the primary wireless audio device 115-*b* (e.g., the master of wireless audio devices). If the secondary wireless audio device 115-*c* hears from the primary wireless audio device 115-*b*, then responds back to it. Otherwise, the secondary wireless audio device 115-*b* may listen to the source device 110-*b* If the secondary wireless audio device 115-*b* receives its own SEQN and a non-LMP packet correctly then it sends an ACK message to the primary wireless audio device 115-*a*. If the secondary wireless audio device 115-*c* receives an own SEQN incorrectly or an LMP packet correctly, then it may respond to the phone with a NACK message, or listen to the primary wireless audio device 115-*b*.

In examples where the device is a single-nonce device, the device may avoid a retransmission from the source device 110-*b* after a non-owned (e.g., sniffed) SEQN. When a non-owned SEQN is lost by a single-nonce device, the next reception may show a MIC error and the source device 110-*b* may retransmit the lost packet. TO avoid retransmission of an owned SQN because of a previously lost SEQN due to a CRC error, the receiving device may increase its packet counter when a non-owned SEQN is received with a CRC error. In some examples, the non-owned SEQN may be retransmitted because the owning wireless audio device also lost it. In such examples, the non-owning device may lose its second chance to receive the non-owned SEQN directly from the source device 110-*b*. When this alteration for handling non-owned SEQN with CRC errors for a single-nonce device, LMP handling may also be modified by a primary wireless audio device 115-*b*. After a primary wireless audio device 115-*b* receives a non-owned SEQN (e.g., DM1) in a packet with a CRC error, primary wireless audio device 115-5*b* may send a message to the second wireless audio device 115-*c* that it has received the SEQN DM1 with CRC error. If the non-owned SEQN packet was an LMP packet, then the secondary wireless audio device 115-*c* may first ensure that the primary wireless audio device 115-*b* has successfully received the LMP packet, and then send an ACK message to source device 110-*b*. Otherwise, the secondary wireless audio device 115-*c* may first communicate with the primary wireless audio device 115-*b* to relay the packet or ignore the loss (e.g., may relay missed packets during a synchronization procedure) and then send an ACK message for the LMP packet. Or, the secondary wireless audio device 115-*c* may send an ACK message for the LMP packet and then relay the packet to the primary wireless audio device 115-*b* or indicate to the primary wireless audio device 115-*b* to ignore the loss.

In some examples, the primary wireless audio device 115-*b* and the secondary wireless audio device 115-*c* may take turns acknowledging L2CAP (ACL-U) packets. Primary wireless audio device 115-*b* may send ACK or NACK message for ACL-U packets with a first SEQN (e.g., 0). Primary wireless audio device 115-*b* may sniff packets with a second SEQN (e.g., 1). Secondary wireless audio device 115-*b* may send ACK or NACK messages (e.g., using a null packet) for ACL-U packets with the second SEQN. Secondary wireless audio device 115-*c* may sniff ACL-U packets having the first SEQN. Secondary wireless audio device 115+-*c* may lose more than one packet in a row if the source device 110-*b* sends ACL-C packets of the second SEQN (making it rare to lose more than one packet in a row). If secondary wireless audio device 115-*c* loses more than one packet in a row, the immediately following reception may be incorrectly decrypted. If the incorrectly decrypted packet is a non-owned SEQN (e.g., an ACL-U packet with the first SEQN) then the packet may be discarded and relayed by the primary wireless audio device 115-*b* (e.g., during a synchronization procedure). For subsequent receptions, the packet counter may be set to a next expected counter so that future packets are correctly decrypted. Otherwise, secondary wireless audio device 115-*c* may send a NACK message after setting the packet counter to the counter value of the received packet and decrypted correctly on reception of the retransmission.

In some examples, where primary wireless audio device 115-*b* owns the first SEQN (e.g., SEQN 0) and the secondary wireless audio device 115-*c* owns the second SEQN (e.g., SEQN1), lost LMP packets with SEQN 1 maybe shared form the secondary wireless audio device 115-*c* to the primary wireless audio device 115-*b* during synchronization. Primary wireless audio device 115-*b* may lose a packet having SEQN 1, and like ACL-U data may consume any LMP packets received thereafter (e.g., after the synchronization procedure). For some LMP packets, the primary wireless audio device 115-*b* may not send any further ACL-U data (e.g., during an encryption procedure). For such LMP packets, the secondary wireless audio device 115-*c* may immediately relay the LMP packet to the primary wireless audio device 115-*b* before sending an ACK message for the LMP packet to the source device 110-*b*.

Generally, the described techniques may provide a reliable protocol for communication involving a number (e.g., N) of SEQNs. A source device 110-*b* may transmit data to a set of one or more sink devices up to a maximum of N devices. These devices maybe referred to as devices D1, D2, through DN. From the set of devices, only one of the devices (e.g., D1) may directly communicate with source device 110-*b*. D1 may thus be referred to as the primary device or primary wireless audio device 115-*b*. The rest of the devices (e.g., non-primary devices) of the set of devices may be connected to D1. Source device 110-*b* may transfer data wirelessly to D1. Such communications may reach all other devices in the set of devices. In some conventional approaches, D1 may supply all received data to non-primary devices, or non-primary devices may have sufficient information not sniff the communication link 130-*a*. During the sniffing, non-primary devices may lose packets, and device D1 may provide the lost data to the non-primary devices from time to time during synchronization procedures. However, as described herein, in some examples, secondary devices may take turns sending ACK or NACK responses to the source device 110-*b*.

In some examples, each device from the set of devices is responsible for sending ACK or NACK messages for a particular SEQN or set of SEQNs from source device 110-*b* (e.g., device DX is responsive for (e.g., owns) SEQN X). When there are less than N devices in the set, some of the devices may be responsible for more than one SEQN. After owning one SEQN by each device, remaining SEQNs maybe owned by the primary device or a device best placed in terms of link quality. Thus, a device may send ACK or NACK messages for its owned SEQN or SEQNs and sniff the rest of the SEQNs. Synchronization between devices may occur as described in the following non-limiting example. If the set of devices includes three devices (e.g., D1, D2, and D3), D1 may exchange packets with D2 to ensure that both devices have received all of the packets of a data stream. Then, the received packets set both for D1 and D2 may be a union of packets received individually from the source device 110-*b*. Subsequently, D1 may exchange packets with D3. Then, D1 and D2 both may have received a packet set including all the packets transmitted by the source device 110-*b*. Finally, D1 may transfer the packets received from D3 to D2, and D2 may receive the packet set also containing all the packets transmitted by the source device 110-*b*.

The described techniques may be particularly useful when the packet encryption key (e.g., nonce) is based on the packet counter value (e.g., when SEQN information is outside such encryption in the packet structure). All devices may own N keys (e.g., nonces) while receiving a packet corresponding to each SEQN, and may use the corresponding key based on SEQN received. That is, a secondary wireless audio device 115-*c* may be capable of holding or setting two nonce values, one for a next expected nonce and one for an after next expected nonce. In such cases, secondary wireless audio device 115-c may receive a packet having a SEQN, and may select one of the two nonce values for decryption based on the SEQN of the packet. Thus, if the secondary wireless audio device 115-c receives a packet having the first SEQN (e.g., a next packet), the secondary wireless audio device 115-c may successfully receive that packet. If, however, the secondary wireless audio device 115-c fails to receive the next packet, and instead receives the after next expected packet, the secondary wireless audio device 115-c may identify the second SEQN (e.g., for the after next packet), and may use the second nonce value to successfully decrypt the packet. Second wireless audio device 115-c may then update its packet counter to reflect the missed packet and continue to set multiple nonce values and receive subsequent packets. As long as the secondary wireless audio device 115-c does not miss more than N packets, the secondary wireless audio device 115-c will be able to successfully decrypt any received packet (e.g., regardless of previously missed packets). Thus, each device may avoid incorrectly decrypted received packets.

The described techniques may be useful when the devices (among a set of devices) is capable of applying one key or nonce value for decrypting a sniffed packet. In such example, a device (e.g., secondary wireless audio device 115-c) may own alternate SEQNs. If there are an odd number of SEQNs, then the first SEQN may be owned by the single nonce device (e.g., secondary wireless audio device 115-c) and the single nonce device may also own every alternating SEQN of the total number of SEQNs. Thus, the single nonce device may at most lose one packet in a row. In some cases, whenever secondary wireless audio device 115-c receives an owned SEQN after a packet loss (e.g., a sniffed SEQN), secondary wireless audio device 115-c may decrypt the packet incorrectly. However, secondary wireless audio device 115-c may increment its packet counter, send a NACK message for the received packet, receive a retransmission of the packet, and correctly decrypt the retransmitted packet using the updated packet counter value.

For some communication protocols, control packets (LPN packets) may be exchanged between the source device 110-b and the primary wireless audio device 115-b. The primary wireless audio device 115-b may process control packets received from the source device 110-b (regardless of whether primary wireless audio device 115-b owns the SEQN of the control packet). In some examples, the control packet may have a SEQN owned by the secondary wireless audio device. In such examples the secondary wireless audio device (e.g., Dx) may not send an ACK message to the source device for the control packet until it receives conformation from the primary wireless audio device that the primary wireless audio device has received the control packet. In some examples, the secondary wireless audio device 115-c (e.g., Dx) may supply the control packet to the primary wireless audio device (e.g., D1) before the control packet is acknowledged to the source device 110-b.

Figure 3:
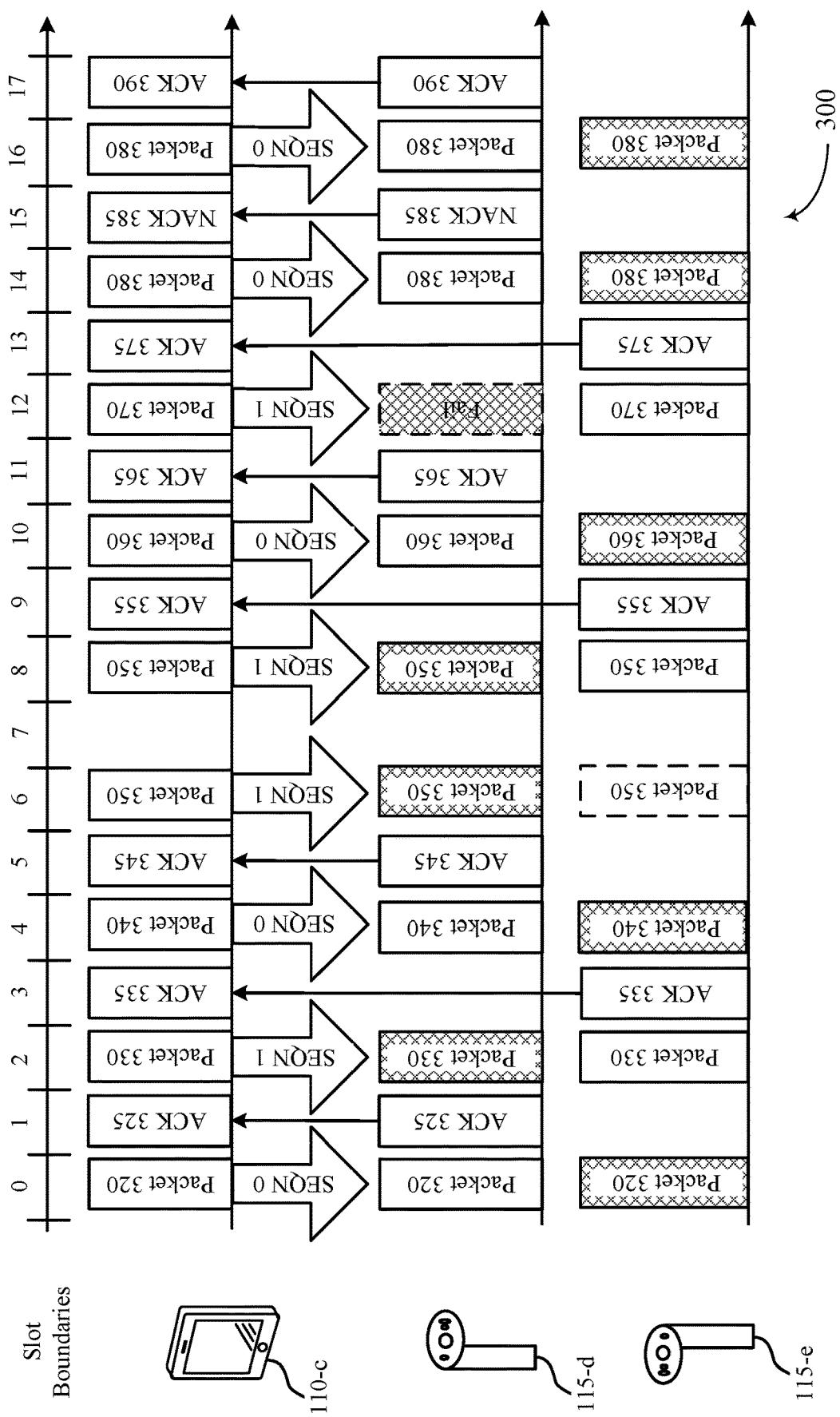
FIG. 3 illustrates an example of a timeline that supports retransmission and new packet detection in wireless systems in accordance with aspects of the present disclosure.

FIG. 3 illustrates an example of a timeline 300 that supports retransmission and new packet detection in wireless systems in accordance with aspects of the present disclosure. In some examples, timeline 300 may implement aspects of wireless communication system 100 and wireless communication system 200.

In some examples, a source device 110-c may communicate with a first wireless audio device 115-d (e.g., a primary earbud). First wireless audio device 115-d may maintain a communication link with source device 110-c. In some examples, second wireless audio device 115-d may sniff the communication link between source device 110-c and first wireless audio device 115-d.

In some examples, each wireless audio device 115 may own one or more SEQNs. For example, where the number of available SEQNs N is equal to two, and the number of wireless audio devices 115 may own one SEQN. A wireless audio device 115 that owns a SEQN may send an ACK message corresponding to the owned SEQN. For instance, first wireless audio device 115-d may own SEQN 0 and second wireless audio device 115-e may own SEQN 1. Packets may be transmitted that span a number of transmission time intervals (TTIs). For example, a packet may span 1 slot, 3 slots, 5 slots, etc. In examples described with respect to FIG. 3, packets may span 1 slot, and a subsequent slot may be used to send ACK or NACK messages to source device 110-c. In some examples, packet decryption may be based on a packet counter value. Thus, it may be important for packet counters to be incremented correctly, such that packet decryption may be successful.

In some examples, wireless audio devices 115 may increment a packet counter for received packets, and send ACK messages for packets that include owned SEQNs. For instance, during slot 0, source device 110-c may transmit packet 320, including SEQN 0, to first wireless audio device 115-d. First wireless audio device 115-d may identify SEQN 0 as the packet owned by first wireless audio device 115-d, and may send an ACK message 325 to source device 110-c during slot 1 based on the identifying SEQN 0 as an owned SEQN. First wireless audio device 115-d may increment its packet counter (e.g., increment the packet counter from packet counter value=a to packet counter value=a+1) after receiving packet 320. Second wireless audio device 115-e may sniff packet 320 during slot 0, and may refrain from sending an ACK message during slot 1 because second wireless audio device 115-e may not own SEQN 0. During slot 2, source device 110-c may transmit packet 330, including SEQN 1. First wireless audio device 115-d may sniff packet 330. First wireless audio device 115-d may then increment its packet counter (e.g., increment the packet counter from packet counter value=a+1 to packet counter value=a+2) after receiving packet 330. Second wireless audio device 115-e may identify SEQN 1 as an owned SEQN, and may receive packet 330. Wireless audio device 115-d may send ACK message 335 for packet 330 during slot 3. Similarly, during slot 4 source device 110-c may send packet 340, including SEQN 0, and first wireless audio device 115-d may receive packet 340 and send ACK message 345 during slot 5. First wireless audio device 115-d may increment its packet counter (e.g., increment the packet counter from packet counter value=a+2 to packet counter value=a+3) after receiving packet 340. Second wireless audio device 115-e may sniff packet 340 during slot 4, and may refrain from sending an ACK message during slot 5.

In some examples, a wireless audio device 115-e may fail to receive a packet with a SEQN it owns, or source device 110-c may fail to receive an ACK or NACK message from a wireless audio device 115-e. For example, during slot 6, source device 110-c may transmit packet 350, including SEQN 1. First wireless audio device 115-d may successfully sniff packet 350, and may increment its packet counter (e.g., increment the packet counter from packet counter value=a+3 to packet counter value=a+4). However, second wireless audio device 115-e may fail to receive packet 350, and may send a NACK message during slot 7. In some examples, second wireless audio device 115-e may send a NACK message or an ACK message during slot 7, but source device 110-c may not receive any NACK message or ACK message from the wireless audio device 115 that owns SEQN 1 (e.g., wireless audio device 115-e). In such examples, during slot 8, source device 110-c may send a retransmission of packet 350, including SEQN 1. First wireless audio device 115-d may successfully sniff the retransmission of packet 350 during slot 8, and may not increment its packet counter. In some examples, first wireless audio device 115-d may determine that packet 350 is a retransmission (e.g., as opposed to a new packet with a sequence flip, or the like). For instance, first wireless audio device 115-d may generate or receive a hash (e.g., based on CRC octets, MIC octets, SEQNs or the like) for each packet received. Upon receiving a packet, a wireless audio device 115 may compare the received or generated hashes to those of previous packets. Based on the comparison, the wireless audio device 115 may determine whether a received packet is a new packet or a retransmission of an old packet. First wireless audio device 115-d may thus determine that packet 350, sniffed during slot 8, is a retransmission. Because packet 350 is a retransmission, first wireless audio device may refrain from incrementing its packet counter. Second wireless audio device 115-e may receive the retransmission of packet 350 during slot 8, and send a corresponding ACK message 355 during slot 9. During slot 10, source device 110-c may transmit packet 360. First wireless audio device 115-d may identify SEQN 0 in packet 360, receive packet 360, and send ACK message 365 during slot 11. First wireless audio device 115-d may increment its packet counter (e.g., increment the packet counter from packet counter value=a+4 to packet counter value=a+5 because the packet counter was incremented upon receiving the retransmission of packet 350 during slot 8. Second wireless audio device 115-e may sniff packet 360 during slot 10.

In some examples, a wireless audio device 115 may miss a non-owned packet. For example, during slot 12, source device 110-c may transmit packet 370, including SEQN 1 (e.g., owned by second wireless audio device 115-e). Second wireless audio device 115-e may receive packet 370, and may transmit ACK message 375 during slot 13. However, first wireless audio device 115-d may miss or packet 370 or receive packet 370 with a CRC error during slot 12. First wireless audio device 115-d may thus fail to increment its packet counter, resulting in a misalignment of packet counters that could have cascading effects. For instance, packet 380 may only be decrypted successfully based on the correct packet counter value (e.g., packet counter value=a+6), but first wireless audio device 115-d may still have an old packet counter value (e.g., packet counter=a+5). Such a packet counter misalignment may result in failed decryption not only for packet 380, but subsequent packets.

In some examples, a wireless audio device 115 may realign a misaligned packet counter after a missed packet. For example, during slot 14, source device 110-c may transmit packet 380, including SEQN 0. Second wireless audio device 115-e may sniff packet 380. First wireless audio device 115-d may receive packet 385, and may determine whether packet 385 having SEQN 0 is a new packet, or a retransmission of packet 360 (e.g., as described above with respect to comparing hashes). Upon attempting to decrypt packet 380, first wireless audio device 115-d may send a NACK message 385 during slot 15. For instance, first wireless audio device 115-d may attempt to decrypt packet 380 using a misaligned packet counter value (e.g., packet counter=a+5), and may throw a MIC error. Or, a genuine MIC error may occur. In either case, first wireless audio device 115-d may increment its packet counter (e.g., increment the packet counter from packet counter value=a+5 to packet counter value=a+6) and send a NACK message 385. In response to the NACK message 385, source device 110-c may send a retransmission of packet 380 during slot 16. First wireless audio device 115-d may receive the retransmission of packet 380, and may use the incremented packet counter value (e.g., packet counter value=a+6) to decrypt the retransmission of packet 380. If there is another MIC error, then first wireless audio device 115-d may implement MIC error procedures. However, if first wireless audio device 115-d successfully decrypts the retransmissions of packet 380, then first wireless audio device 115-d may increment its packet counter and send ACK message 390 to source device 110-c during slot 17. Second wireless audio device 115-e may sniff packet 380 during slot 16, determine that it is a retransmission (e.g., as described above with respect to comparing hashes), and refrain from transmitting an ACK message (e.g., based on the non-owned SEQN 0).

Second wireless audio device 115-e may similarly increment its packet counter, as described herein with respect to first wireless audio device 115-d. For instance, if second wireless audio device 115-e misses a packet that it does not own, it may throw a MIC error and send a NACK message for a next owned packet after the missed packet, increment its packet counter, and then successfully decrypt a next packet using the incremented packet counter value.

In some examples, a wireless audio device 115 may also sniff ACK and NACK messages between another wireless audio device 115 and a source device 110-c. However, the techniques described above may also be implemented where a wireless audio device 115 does not sniff ACK message or NACK messages send from another wireless audio device 115.

The techniques described with respect to FIG. 3 may be implemented by, for example, a wireless audio device 115 that has single-nonce (e.g., single key) capabilities. In some examples, a wireless audio device 115 may have double-nonce capabilities, as described in greater detail with respect to FIG. 4.

Figure 4:
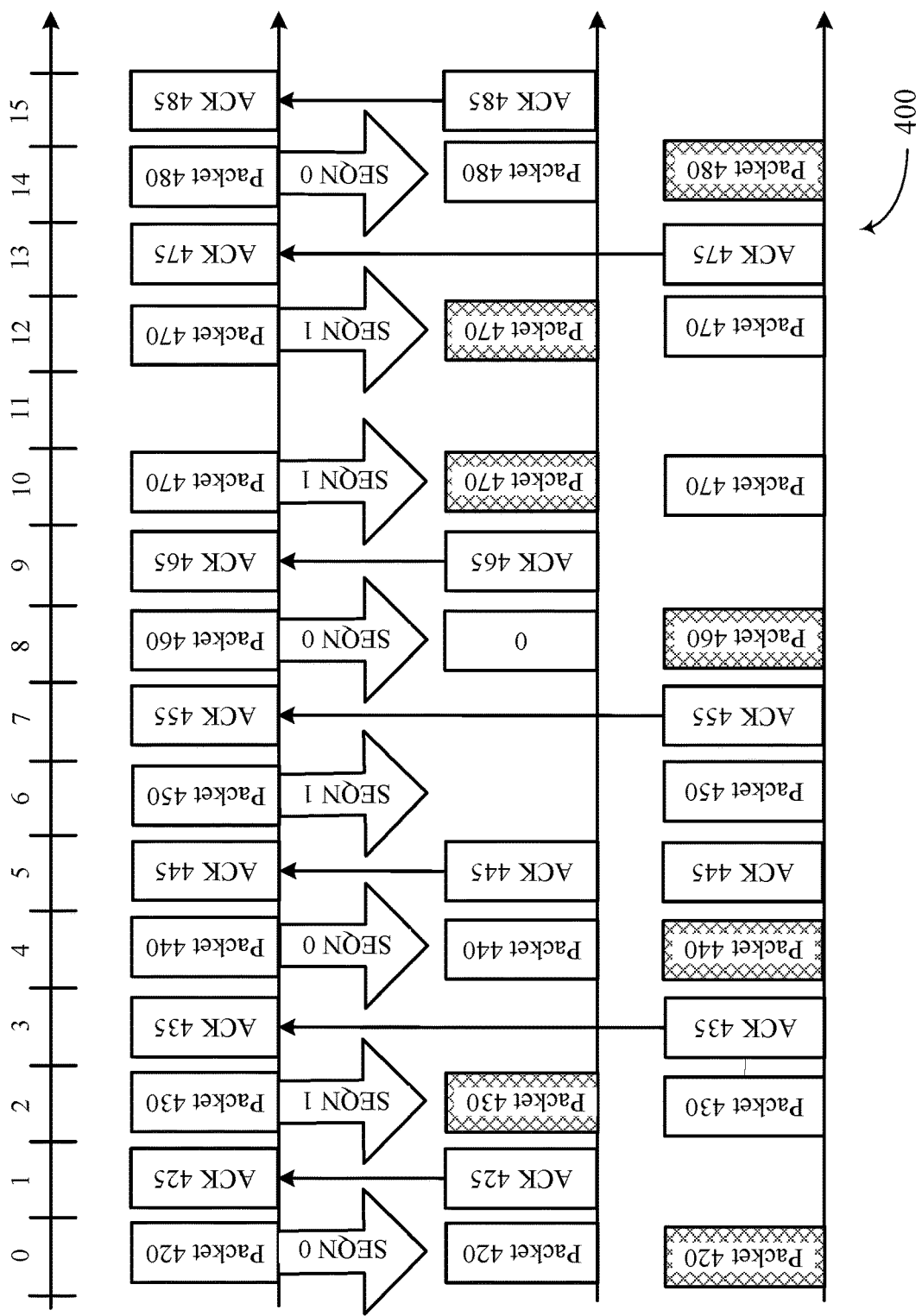
FIG. 4 illustrates an example of a timeline that supports retransmission and new packet detection in wireless systems in accordance with aspects of the present disclosure.

FIG. 4 illustrates an example of a timeline 400 that supports retransmission and new packet detection in wireless systems in accordance with aspects of the present disclosure. In some examples, timeline 400 may implement aspects of wireless communication system 100 and wireless communication system 200.

As described with respect to FIGS. 2-3, a source device 110-d may be in communication with a first wireless audio device 115-f (e.g., a primary ear bud), and a second wireless audio device 115-g (e.g., a secondary ear bud) may sniff a communication link between the first wireless audio device 115-f and source device 110-d.

In some examples, one or both of first wireless audio device 115-f and second wireless audio device 115-g may be capable of using multiple nonces or keys (e.g., a double-nonce capable device). In one example, a first wireless audio device 115-f may identify a packet counter value (e.g., packet counter value=a) for a current packet, and a packet counter value (e.g., packet counter value=a+1) for a next packet. In some cases, the device may set a nonce value for the current packet and a nonce value for a next packet based at least in part on the packet counter value, and may and use the nonce values to decrypt the packets. In some cases, the first wireless audio device 115-f may perform a message integrity check (MIC) on the decrypted packet. In some cases, first wireless audio device 115-f may identify a packet counter value (e.g., a+2) for a third, later packet after next packet (e.g., a packet expected directly after the next packet).

In some cases, a device (e.g., first wireless audio device 115-*f*) may identify SEQNs corresponding to packet counter values. For instance, an owned SEQN may correspond to one packet counter value and nonce value (e.g., a current packet counter value), and a non-owned SEQN may correspond to another packet counter value and another nonce value (e.g., a next packet for a next packet). Thus, a first wireless audio device 115-*f*, for example, may set a first nonce value according to a current packet counter value, and may set a second nonce value according to a next packet counter value. Upon receiving a packet or sending an ACK message for a received packet, the first wireless audio device 115-*f* may increment its packet counter, and may also set a new current nonce value and next nonce value (e.g., the new current packet counter value may be equal to the previously set next packet counter value, and the new next packet counter value may be set equal to the previous after-next packet counter value).

In some examples, a current packet counter value (and corresponding nonce value) may correspond to an expected SEQN. If a wireless audio device 115 is expecting to receive an owned SEQN, then the current nonce value may correspond to the owned SEQN, and the next nonce value may correspond to a non-owned SEQN. Similarly, if a wireless audio device 115 is expecting to sniff a packet including a non-owned SEQN, then the current nonce value may correspond to a non-owned SEQN and the next nonce value may correspond to the owned SEQN. Accordingly, when the device is in sniffing mode the device may decrypt a packet using a first nonce value when the sequence number is owned (e.g., and may decrypt a packet using a second nonce value when the sequence number is not owned).

In some examples, during slot 0, source device 110-*d* may send a packet 420 including SEQN 0, and first wireless audio device 115-*f* may own SEQN 0 and receive packet 420. Second wireless audio device 115-*g* may sniff packet 420. First wireless audio device 115-*f* may have a current packet value counter (e.g., packet counter value=a, corresponding to expected owned SEQN 0) and a next packet counter value (e.g., packet counter value=a+1, corresponding to non-owned SEQN 1). First wireless audio device 115-*f* may set a current nonce value based on the current packet counter value and a second nonce value based on the next packet counter value. Upon identifying SEQN 0 in packet 420, first wireless audio device 115-*f* may decrypt packet 420 based on the first nonce value, send ACK message 425 during slot 1, and increment its packet counter and corresponding nonce values (e.g., a new current packet counter value of a+1, and a new next packet counter value of a+2).

During slot 2, source device 110-*d* may send a packet 430 including SEQN 1. First wireless audio device 115-*f* may sniff packet 430 and identify expected non-owned SEQN 1. First wireless audio device 115-*f* may decrypt packet 430 based on the first nonce value (e.g., corresponding to the new current packet counter value a+1), and increment its packet counter (e.g., a new current packet counter value of a+2, and a new next packet counter value of a+3). Second wireless audio device 115-*g* may receive packet 430 during slot 2 and send ACK message 435 during slot 3. Second wireless audio device 115-*g* may increment its own packet counter (e.g., a single packet counter value for a single nonce or two packet counter values for a double nonce incrementation). During slot 4, source device 110-*d* may transmit packet 440 including SEQN 0, and first wireless audio device 115-*f* may receive packet 440. Upon identifying SEQN 0, first wireless audio device 115-*f* may use the current packet counter value a+2 and its corresponding nonce value to decrypt packet 440, and may transmit ACK message 445 and increment its packet counter (e.g., a new current packet counter value of a+3 and a new next packet counter value a+4).

In some examples, a wireless audio device 115 may miss a sniffed packet, but may be able to maintain packet counter alignment due to double-nonce capabilities. During slot 6, source device 110-*d* may transmit packet 450 including SEQN 1. First wireless audio device 115-*f* may fail to sniff packet 450 (e.g., due to a CRC error or an unheard packet). Second wireless audio device 115-*g* may receive packet 450 and send ACK message 455 during slot 7. Having received ACK message 455, source device 110-*d* may send packet 460, including SEQN 0, during slot 8. First wireless audio device 115-*f* may receive SEQN 0. Having failed to receive packet 450, first wireless audio device 115-*f* may not have incremented its packet counter. Thus, it may still have its current packet counter value set to a+3, and its next packet counter value set to a+4. The current packet counter value (e.g., a+3) may correspond to the expected SEQN 1, and the next packet counter value (e.g., a+4) may correspond to SEQN 0. First wireless audio device may be expecting packet 450 (which was previously missed during slot 6). However, packet 460 may correspond to a packet counter value of a+4, and decryption of packet 460 may fail if decryption is based on a wrong packet counter value (e.g., a+3). First wireless audio device 115-*f* may identify SEQN 0 for packet 460, and may thus select the packet counter value a+4 (and its corresponding nonce value), and may decrypt packet 460 successfully based thereon. Then, first wireless audio device 115-*f* may send ACK message 465 for packet 460 during slot 9, and may increment its packet counter, (e.g., set a current packet counter value of a+5 and a next packet counter value of a+6).

In some examples, a wireless audio device 115 may realign its packet counter values after another wireless audio device misses a packet. For instance, during slot 10, source device 110-*d* may transmit packet 470, including SEQN 1. First wireless audio device 115-*f* may sniff packet 470, and may increment its packet counter values accordingly (e.g., set a current packet counter value of a+6 and a next packet counter value of a+7). However, second wireless audio device 115-*g* may fail to receive packet 470, and may therefore not send an ACK or NACK message during slot 11. Having failed to receive an ACK or NACK message during slot 11, source device 110-*d* may send a retransmission of Packet 470 during slot 12. First wireless audio device 115-*f* may sniff packet 470, and may refrain from incrementing its packet counter values based on determining that packet 470 is a retransmission, thus maintaining packet counter value alignment. Second wireless audio device 115-*g* may receive packet 470, send ACK message 475 during slot 13, and may increment its own packet counter values. During slot 14, source device 110-*d* may transmit packet 480, including SEQN 0. Second wireless audio device 115-*g* may sniff packet 480. First wireless audio device 115-*f* may receive packet 480, and may decrypt it correctly using its current packet counter value (e.g., a+6). During slot 15, first wireless audio device 115-*f* may send ACK message 485 for packet 480, and may increment its packet counter values.

Figure 5:
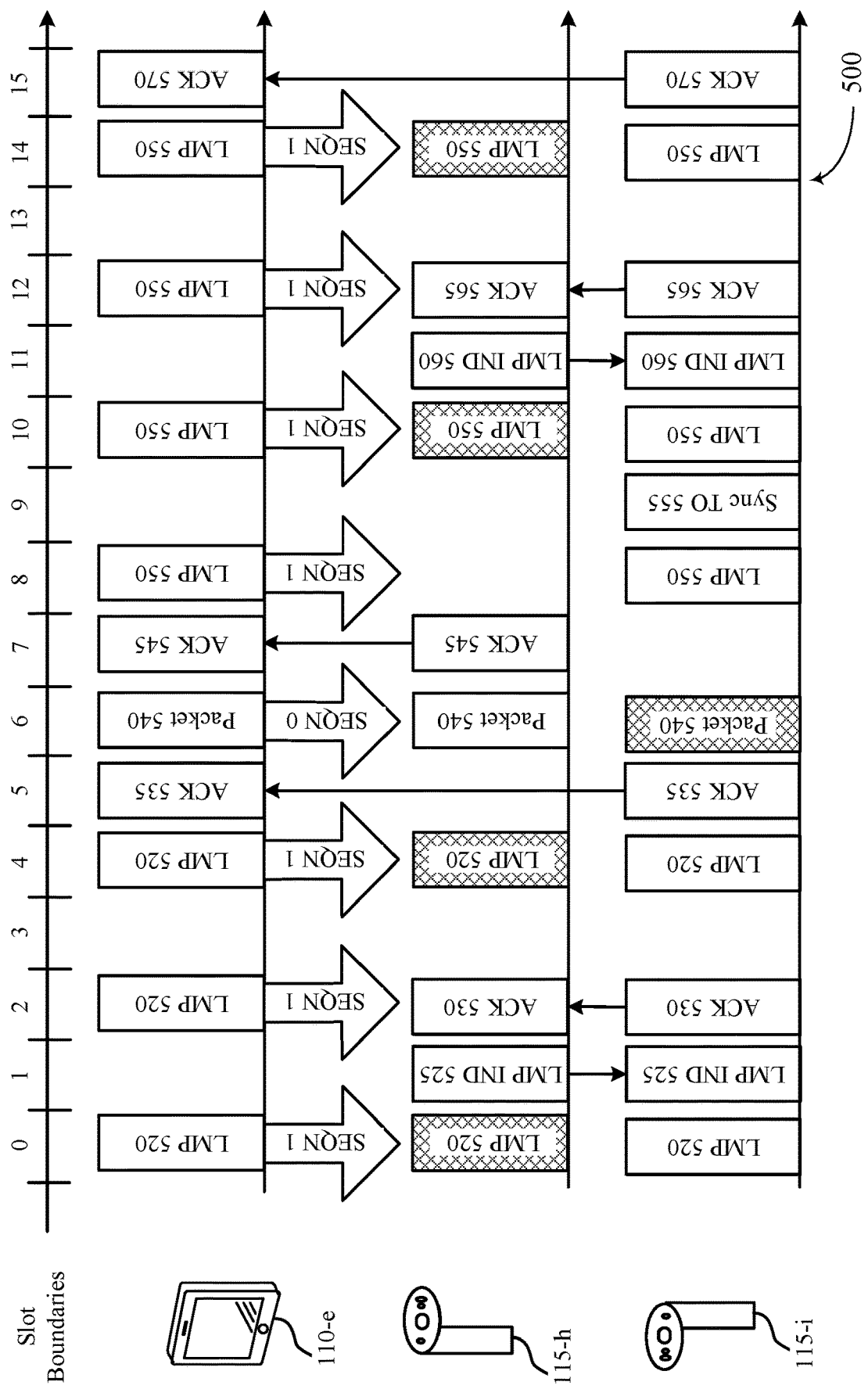
FIG. 5 illustrates an example of a timeline that supports retransmission and new packet detection in wireless systems in accordance with aspects of the present disclosure.

FIG. 5 illustrates an example of a timeline 500 that supports retransmission and new packet detection in wireless systems in accordance with aspects of the present disclosure. In some examples, timeline 500 may implement aspects of wireless communication system 100 and wireless communication system 200.

In some examples, packets received by a wireless audio device 115 may be a control packet (e.g., an LMP packet). LMP packets may be processed by a primary wireless audio device 115. However, an LMP packet may include a SEQN owned by a secondary wireless audio device 115. In such examples, a secondary wireless audio device 115 may ensure that the primary wireless audio device 115 has not lost the LMP packet before acknowledging the packet.

During slot 0, source device 110-e may transmit an LMP packet 520 including SEQN 1, which may be owned by a another wireless audio device (e.g., second wireless audio device 115-i). A wireless audio device 115 (e.g., first wireless audio device 115-h) may sniff LMP packet 520. Second wireless audio device 115-i may receive LMP packet 520, but may wait to acknowledge LMP packet 520 until it has ensured that first wireless audio device 115-h has received LMP packet 520. During slot 1, first wireless audio device 115-e may send an LMP indication 525, indicating that first wireless audio device 115-e successfully received LMP packet 520. During slot 3, second wireless audio device 115-i may send an ACK message 540 or another message indicating that it has received LMP indication 525. Having failed to receive an ACK or NACK message from second wireless audio device 115-i during slot 1, source device 110-e may send a retransmission of LMP packet 520. In some examples, second wireless audio device 115-i may refrain from sending an ACK or NACK message during slot 3 (e.g., because second wireless audio device 115-i was sending ACK message 530 during slot 2, instead of receiving the retransmission of LMP packet 520). During slot 4, source device 110-e may send another retransmission of LMP packet 520, having failed to receive an ACK or NACK message during slot 3. First wireless audio device 115-h may sniff LMP packet 520, and second wireless audio device 115-i may receive LMP packet 520. Having already received confirmation that first wireless audio device 115-h successfully received LMP packet 520 (e.g., during slot 1), second wireless audio device 115-i may transmit ACK message 535 during slot 5. Source device 110-e may transmit a data packet 540 during slot 6. First wireless audio device 115-h may receive packet 540, and second wireless audio device 115-i may sniff packet 540. During slot 7, first wireless audio device 115-h may send ACK message 545 for packet 540.

In some examples, a wireless audio device 115 may miss an LMP packet with a non-owned SEQN. For instance, during slot 8, source device 110-e may transmit LMP packet 550, including SEQN 1, which may be owned by a secondary wireless audio device 115 (e.g., second wireless audio device 115-i). Second wireless audio device 115-I may receive LMP packet 550. However, first wireless audio device 115-h may fail to sniff LMP packet 550 (e.g., may not hear LMP packet 550 or may perform a CRC resulting in a CRC error). As described above, second wireless audio device 115-i may refrain from transmitting an ACK message for LMP packet 550 until it receives confirmation from first wireless audio device 115-h that first wireless audio device 115-h has received LMP packet 550. Thus, second wireless audio device 115-i may wait during synchronization transmission opportunity 555 for such confirmation. During slot 10, source device 110-e may send a retransmission of LMP packet 550, including SEQN 1. First wireless audio device 115-h may successfully sniff the retransmission of LMP packet 550 during slot 10. Second wireless audio device 115-i may receive the retransmission of LMP packet 550, and may determine that it is a retransmission (e.g., as opposed to a new packet). IT may then wait, during slot 11, for LMP indication 560 from first wireless audio device 115-h. Upon receiving LMP indication 560, second wireless audio device 115-i may transmit ACK message 565 during slot 12, indicating that it has received LMP indication 560. During slot 12, source device 110-e may transmit another retransmission of LMP packet 550 because source device 110-e received no ACK or NACK message during slot 11. During slot 13, second wireless audio device 115-i may refrain from transmitting an ACK or NACK message, because it did not receive the retransmission of LMP packet 550 during 12 (e.g., due to ACK message 565). During slot 14, source device 110-e may send another retransmission of LMP packet 550, including SEQN 1. First wireless audio device 115-h may sniff LMP packet 550, and determine that it is a retransmission. Second wireless audio device 115-i may receive LMP packet 550. Having determined that first wireless audio device 115-h successfully received LMP packet 550 (e.g., via LMP indication 560), second wireless audio device 115-i may send ACK message 570.

Figure 6:
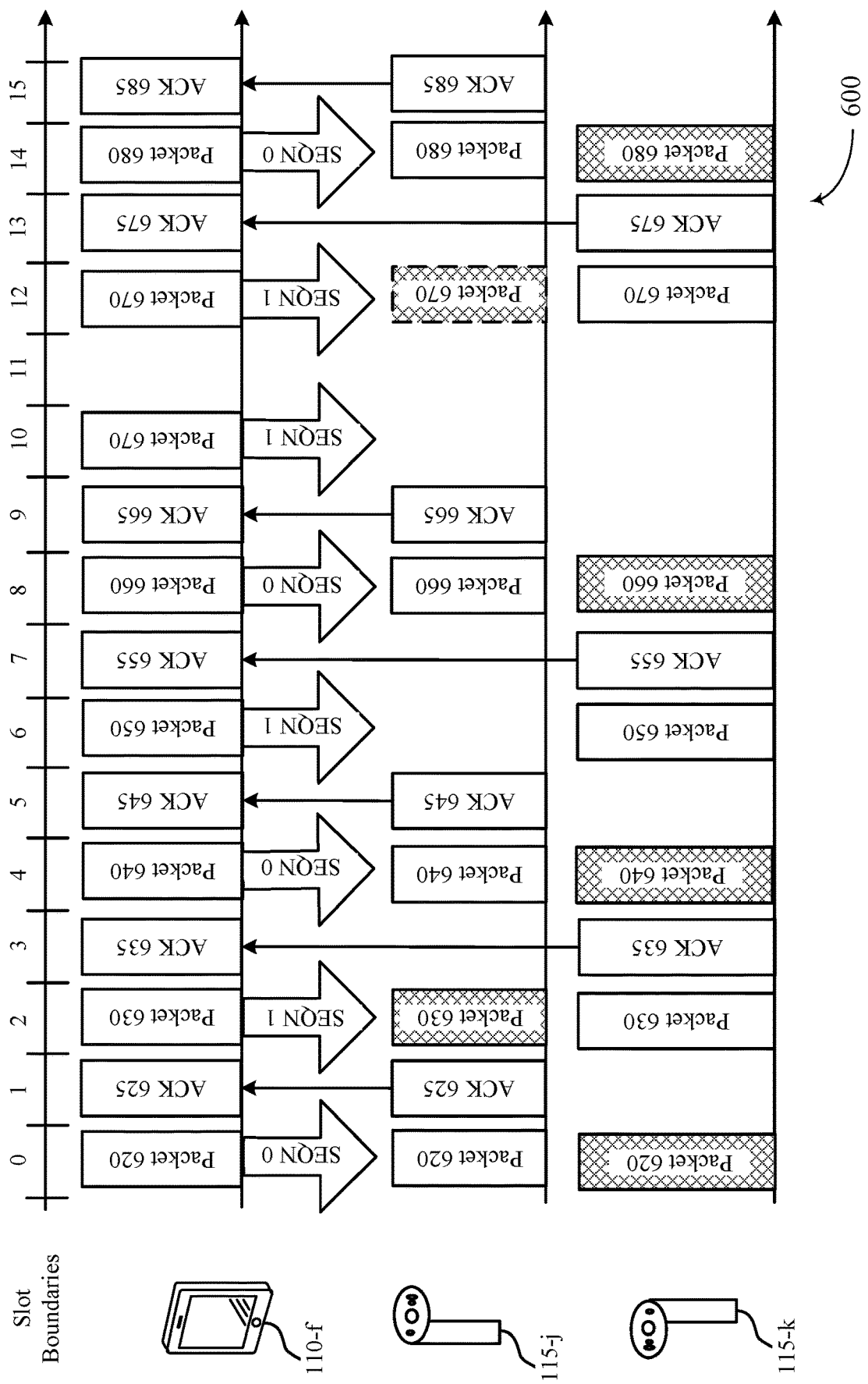
FIG. 6 illustrates an example of a timeline that supports retransmission and new packet detection in wireless systems in accordance with aspects of the present disclosure.

FIG. 6 illustrates an example of a timeline 600 that supports retransmission and new packet detection in wireless systems in accordance with aspects of the present disclosure. In some examples, timeline 600 may implement aspects of wireless communication system 100 and wireless communication system 200.

In some examples, a wireless audio device 115 (e.g., a single-nonce capable earbud) may avoid a retransmission after losing a packet including a non-owned SEQN. If a previous non-owned SEQN is lost (e.g., due to CRC error), then a wireless audio device 115 may avoid a retransmission of a packet including an owned SEQN (e.g., instead of sending a NACK message for the owned SEQN and receiving a retransmission), the wireless audio device 115 may increase its packet counter when the non-owned SEQN packet is received with the CRC error).

For example, during slot 0, source device 110-f may transmit packet 620, including SEQN 0. First wireless audio device 115-j (e.g., a primary earbud) may identify SEQN 0 as an owned SEQN, and may receive packet 620. During slot 1, first wireless audio device 115-j may send an ACK message 625 for packet 620, and may increment its packet counter value (e.g., set the packet counter value=a+1). Second wireless audio device 115-k may sniff packet 620. During slot 2, source device 110-f may send packet 630, including SEQN 1. Second wireless audio device 115-k may identify SEQN 1 as an owned SEQN, may receive packet 630, may send ACK message 635 during slot 3, and may increment its packet counter value (e.g., set the packet counter value=a+2). First wireless audio device 115-j may sniff packet 630 during slot 3. During slot 4, source device 110-f may transmit packet 640, including SEQN 0. First wireless audio device 115-j may identify SEQN 0 as an owned SEQN, and may receive packet 640, send ACK message 645 during slot 5, and increment its packet counter value (e.g., set the packet counter value=a+3). Second wireless audio device 115-k may sniff packet 640.

In some examples, a wireless audio device 115 may miss a sniffed packet, but still increment its packet counter value to maintain packet counter alignment. For example, source device 110-f may transmit packet 650. Second wireless audio device 115-k may receive packet 650 and transmit ACK message 655 (and increment its own packet counter value). First wireless audio device 115-j may fail to receive packet 650. In some examples, first wireless audio device 115-*j* may generate a CRC error while attempting to decrypt packet 650. First wireless audio device 115-*j* may still increment its packet counter value (e.g., set the packet counter value=a+4). Subsequently, source device 110-*f* may transmit packet 660 including SEQN 0 during slot 8. First wireless audio device 115-*j* may receive packet 660, may correctly decrypt packet 660 based on the previously incremented packet counter value (e.g., packet counter value=a+4), and may increment its packet counter value (e.g., set the packet counter value=a+5). First wireless audio device 115-*j* may transmit ACK message 665 for packet 660 during slot 9.

In some examples, a wireless audio device 115 may fail to receive at least two owned SEQNs in a row. For instance, after failing to sniff packet 650, and receiving packet 660, first wireless audio device 115-*f* may miss packet 670. Source device 110-*f* may transmit packet 670, including SEQN 1 during slot 10. First wireless audio device 115-*j* may fail to sniff packet 670 (e.g., may receive packet 670 with a CRC error), but may increment its packet counter value (e.g., set its packet counter value=a+6). In some examples, second wireless audio device 115-*k* may fail to receive packet 670, and may not send an ACK or NACK message during slot 11. Source device 110-*f* may send a retransmission of packet 670 during slot 12. Second wireless audio device 115-*k* may successfully receive the retransmission of packet 670 during slot 12, identify SEQN 1 as an owned SEQN, and may transmit ACK message 675 during slot 13. Having previously incremented its packet counter to a+6, first wireless audio device 115-*f* may fail to successfully decrypt packet 670. First wireless audio device 115-*f* may therefore receive packet 670 with a MIC error, and may discard packet 670. During slot 14, source device 110-*f* may transmit packet 680. First wireless audio device 115-*j* may successfully decrypt packet 680 (e.g., based on the packet counter value a+6), and may send ACK message 685 during slot 15. Second wireless audio device 115-*k* may sniff packet 680. As described previously, second wireless audio device 115-*k* may or may not be a single-nonce device. In the case where second wireless audio device 115-*k* is a single-nonce device, second wireless audio device 115-*k* may increment its packet counter values as described herein with respect to first wireless audio device 115-*j*.

In some examples (e.g., in slots 10 and 12, respectively, as described with respect to FIG. 6), a packet including a non-owned (e.g., sniffing) SEQN may be retransmitted when the other wireless audio device 115 misses it. In such examples, the sniffing wireless audio device 115 may lose its opportunity to receive the sniffed SEQN directly from the source device 110. In such examples, a missed packet (e.g., packet 670 or packet 650 for first wireless audio device 115-*j* may be received during a synchronization procedure. For instance, first wireless audio device 115-*j* may indicate to second wireless audio device 115-*k* during a synchronization procedure, that packets 650 and 670 were missed. Second wireless audio device 115-*j* may then provide the missed packets 650 and 670 to first wireless audio device 115-*j*. Similarly, if second wireless audio device 115-*k* misses any packets, it may request and received the missed packets from first wireless audio device 115-*j* during a synchronization procedure.

In some examples, as described above, a wireless audio device 115 will avoid retransmission of a packet including an owned SEQN by incrementing its packet counter for a packet including a non-owned SEQN that is not successfully decrypted. However, in some examples, as described in greater detail with respect to FIG. 7, the missed packet including a non-owned SEQN may be an LMP packet.

Figure 7:
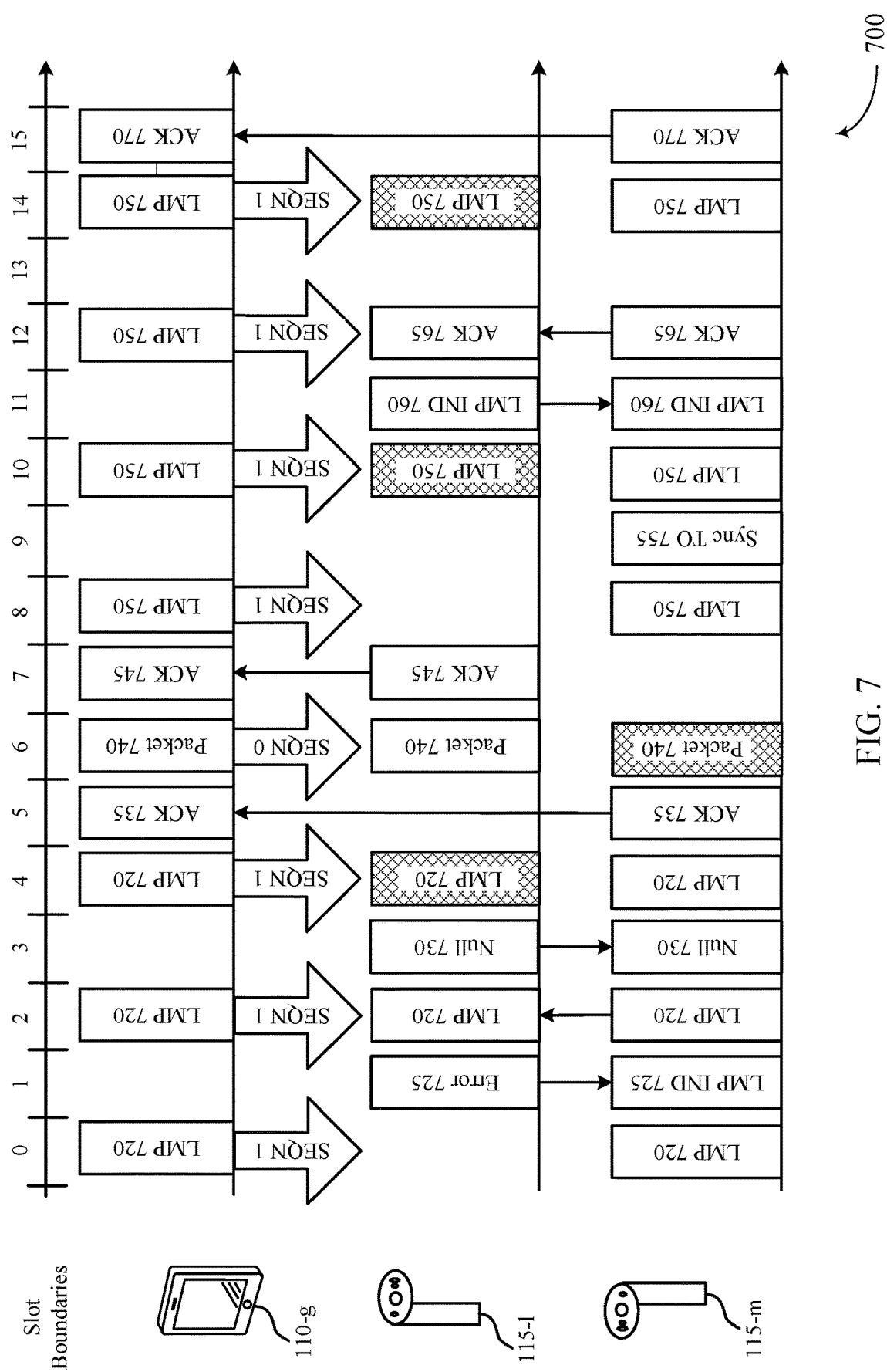
FIG. 7 illustrates an example of a timeline that supports retransmission and new packet detection in wireless systems in accordance with aspects of the present disclosure.

FIG. 7 illustrates an example of a timeline 700 that supports retransmission and new packet detection in wireless systems in accordance with aspects of the present disclosure. In some examples, timeline 700 may implement aspects of wireless communication system 100 and wireless communication system 200.

In some examples, source device 110-*g* may transmit an LMP packet 720 including SEQN 1. Second wireless audio device 115-*m* may receive LMP packet 720, and may increment its packet counter (e.g., may increment the packet counter value from packet counter value=a+1 to packet counter value=a+2). However, second wireless audio device 115-*m* may ensure that first wireless audio device 115-*l* has received LMP packet 720 before sending an ACK message. First wireless audio device 115-*l* may indicate to second wireless audio device 115-*m* indicate whether it received the LMP packet 720, or indicates that it has received LMP packet 720 with a CRC error. For instance, first wireless audio device 115-*l* may sniff LMP packet 720 and generate a CRC error. First wireless audio device 115-*l* may still increment its packet counter value (e.g., may increment the packet counter value from packet counter value=a+1 to packet counter value=a+2). First wireless audio device 115-*l* may send error message 725 to second wireless audio device 115-*m* during slot 1, indicating that it sniffed packet 720, including SEQN 1, with a CRC error. Second wireless audio device 115-*m* may then transmit LMP packet 720 to first wireless audio device 115-*l* during slot 2. During slot 2, source device 110-*g* may send a retransmission of LMP packet 720, having not received an ACK message or a NACK message during slot 1. First wireless audio device 115-*l* may then send a null packet 730 (e.g., an ACK message) during slot 3 to second wireless audio device 115-*m* indicating that it has received LMP packet 720. During slot 4 source device 110-*g* may send another retransmission of LMP packet 720. First wireless audio device 115-*l* may sniff LMP packet 720, and may identify it as a retransmission Similarly, second may increment the packet counter value from packet counter value=a+1 to packet counter value=a+2. Second wireless audio device 115-*m* may receive the retransmission of LMP packet 720, and may identify it as a retransmission. In some examples, first wireless audio device 115-*l* and second wireless audio device 115-*m* may discard the LMP packet, having previously received it (e.g., during slot 2 and slot 0, respectively). Having ensured that both wireless audio devices 115 have received packet 720, second wireless audio device 115-*m* may transmit ACK message 735 for LMP packet 720 during slot 5.

Having received ACK message 735, source device 110-*g* may transmit packet 740 including SEQN 0 during slot 6. First wireless audio device 115-*l* may receive and successfully decrypt packet 740 (e.g., based on the previously incremented packet counter value=a+2). First wireless audio device 115-*l* may increment its packet counter (e.g., may increment its packet counter from packet counter value=a+2 to packet counter value=a+3). Second wireless audio device 115-*m* may sniff packet 740 during slot 6, and may increment its packet counter (e.g., may increment its packet counter from packet counter value=a+2 to packet counter value=a+3).

Having received ACK message 745 during slot 7, source device 110-*g* may transmit LMP packet 750 including SEQN 1 during slot 8. Second wireless audio device 115-*m* may receive LMP packet 750, and may increment its packet counter (e.g., may increment its packet counter from packet counter value=a+3 to packet counter value=a+4). First wireless audio device 115-*l* may miss the packet entirely. During synchronization transmission opportunity 755, second wireless audio device 115-*m* may wait to receive an indication from first wireless audio device 115-*l* indicating that it has received the LMP packet 750, or that it has received the LMP packet 750 with a CRC error. However, because first wireless audio device 115-*l* missed LMP packet 750, second wireless audio device 115-*m* may receive no such signal during synchronization transmission opportunity 755. During slot 10, source device 110-*g* may send a retransmission of LMP packet 750. First wireless audio device 115-*l* may sniff LMP packet 750, may successfully decrypt LMP packet 750 based on the previously incremented packet counter, and may increment the packet counter (e.g., may increment the packet counter value from packet counter value=a+3 to packet counter value=a+4). During slot 11, first wireless audio device 115-*l* may transmit an LMP indication 760, indicating that it has successfully received LMP packet 750. Upon receiving LMP indication 760, second wireless audio device 115-*m* may send an ACK message 765 for LMP indication 760. Source device 110-*g* may also send another retransmission, if LMP packet 750 during slot 12. However, due to the transmission of ACK message 765 during slot 12, second wireless audio device 115-*m* may not send an ACK or NACK message during slot 13. During slot 14, source device 110-*g* may send another retransmission of LMP packet 750. First wireless audio device 115-*l* may sniff LMP packet 750, and may identify it as a retransmission. Second wireless audio device 115-*m* may receive the retransmission of LMP packet 750, may identify it as a retransmission of previously received LMP packet 750 (e.g., during slot 8) and may send ACK message 770 for LMP packet 750.

Figure 8:
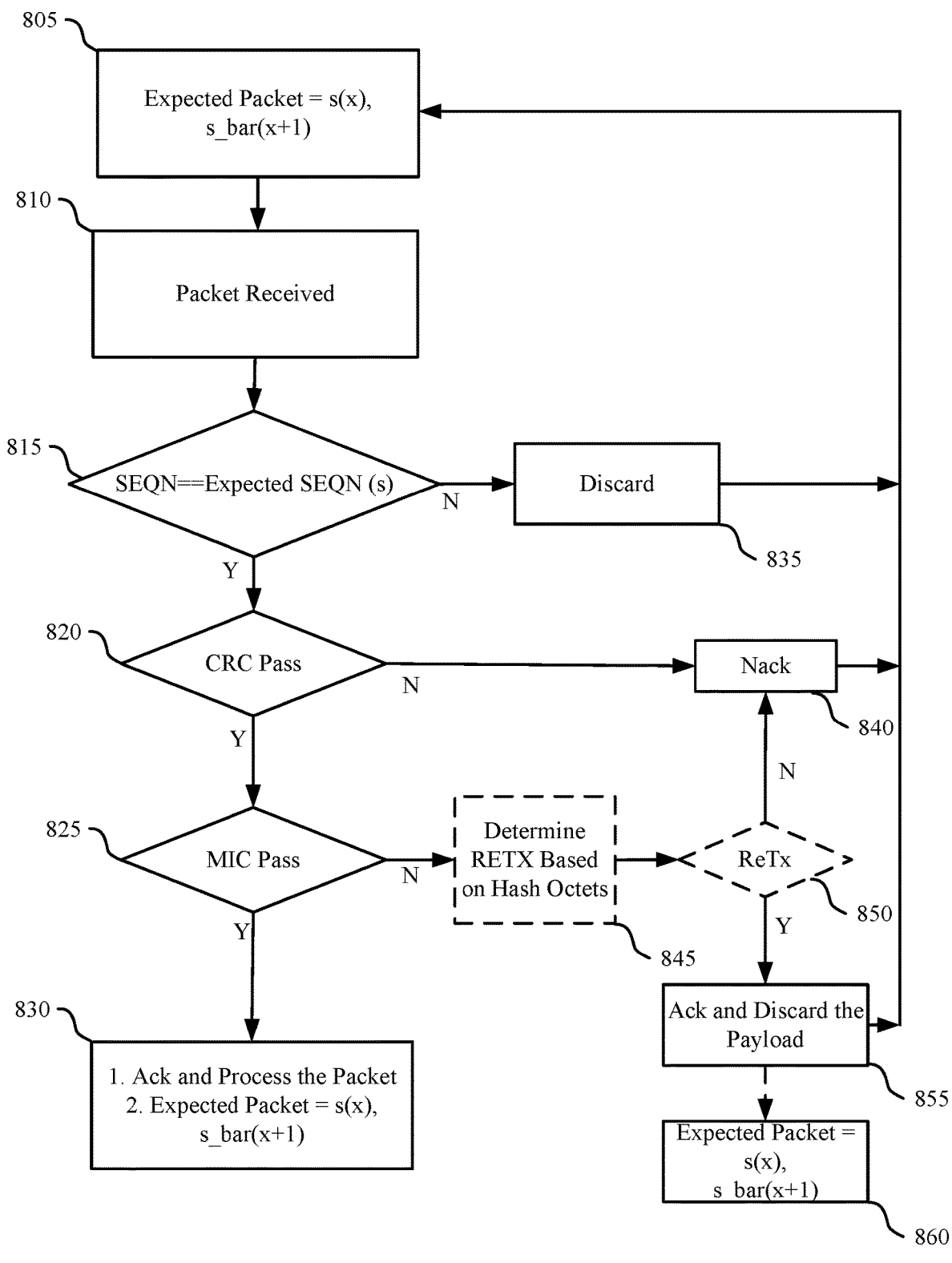
FIG. 8 illustrates an example of a flow chart that supports retransmission and new packet detection in wireless systems in accordance with aspects of the present disclosure.

FIG. 8 illustrates an example of a timeline 800 that supports retransmission and new packet detection in wireless systems in accordance with aspects of the present disclosure. In some examples, timeline 800 may implement aspects of wireless communication system 100 and wireless communication system 200.

In some examples, a wireless audio device may set one or more packet counter values. For instance, a wireless audio device may own a SEQN=s, and may sniff SEQN=s_bar. Nonce values may be based on packet counter values. At 805, wireless audio device may set a nonce value such that an expected packet=s(x) and a packet after the expected packet=s_bar(x+1).

At 810, the wireless audio device may receive a packet with an owned packet (e.g., SEQN s). At 815, the wireless audio device may determine whether the SEQN of the packet received at 810 is equal to the expected SEQN s. If the expected SEQN is not equal to the received SEQN, then at 835, the wireless audio device may discard the received packet, and may set or reset the nonce values again at 805.

If the expected SEQN is equal to the SEQN of the received packet, then the wireless audio device 115 may determine whether the CRC is a pass at 820. If the wireless audio device determines that there is no CRC pass, then the wireless audio device may send a NACK message at 840 for the packet received at 810, and may then set or reset the nonce values at 805.

If the wireless audio device determines that there is a CRC pass, then at 825 the wireless audio device may determine if there is a MIC pass. If there is no MIC pass, then the wireless audio device may NACK the packet at 840 or ACK and discard the payload at 855, depending on whether the wireless audio device will request a retransmission at 850. In some examples, at 845, the wireless audio device may determine whether the packet received at 810 is a retransmission or a new packet. The wireless audio device may make this determination based on hash octets (e.g., based on hashes received or based on CRC octets, MIC octets, or the like). At 850, if the packet is a retransmission, then it may send a NACK message at 840 and then set or reset the nonce values at 805. If the packet is not a retransmission of the packet, then the wireless audio device may send an ACK message to the source device and discard the payload at 855. In such examples, the wireless audio device may set the expected packet counter value=s_bar (x+1) and an after next packet=s(x) at 860.

Figure 9:
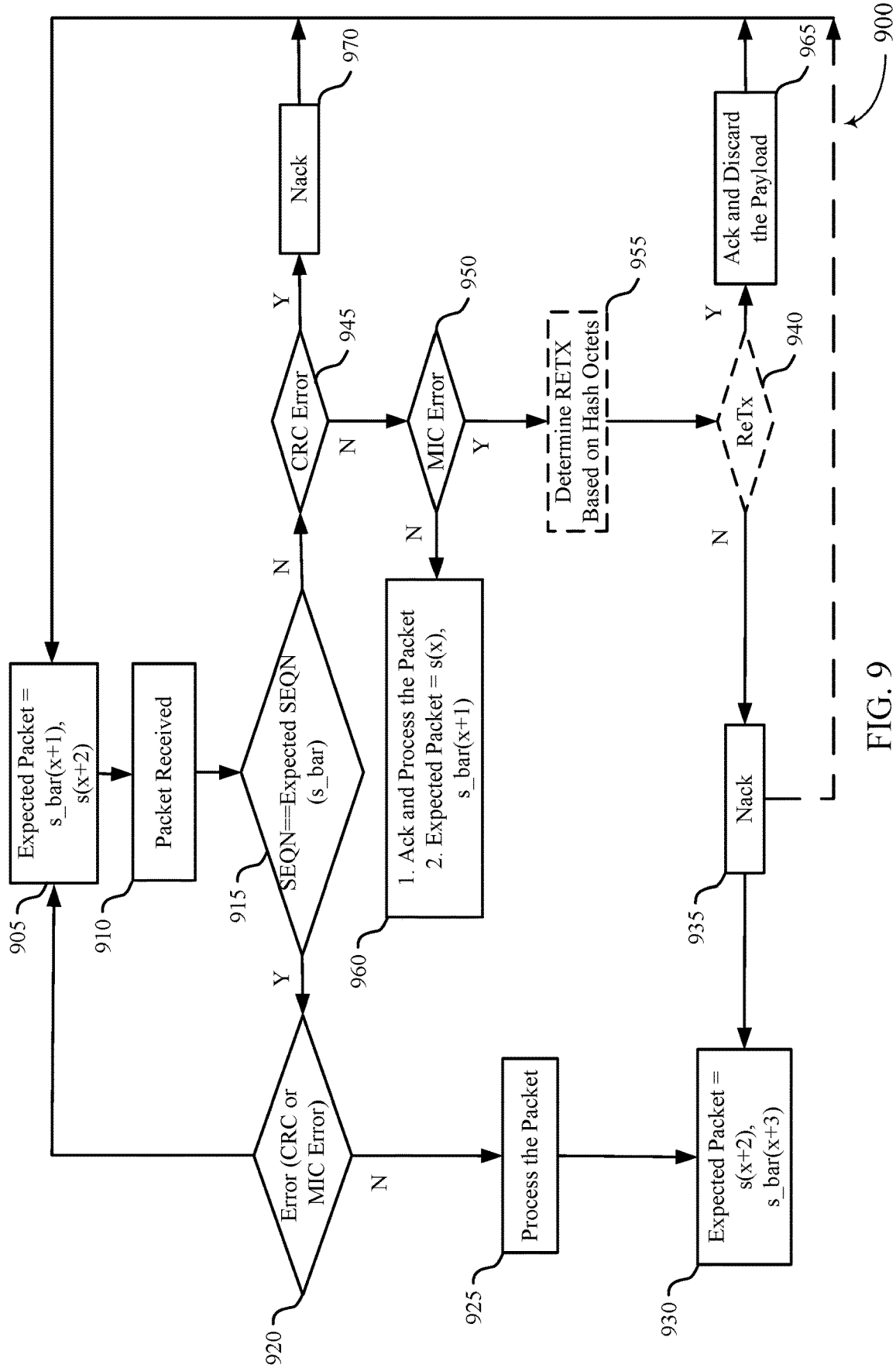
FIG. 9 illustrates an example of a flow chart that supports retransmission and new packet detection in wireless systems in accordance with aspects of the present disclosure.

FIG. 9 illustrates an example of a for chart 900 that supports retransmission and new packet detection in wireless systems in accordance with aspects of the present disclosure. In some examples, flow chart 900 may implement aspects of wireless communication system 100 and wireless communication system 200.

In some examples, the wireless audio device may set one or more packet counter values. For instance, a wireless audio device may own a SEQN=s, and may sniff SEQN=s_bar. Nonce values may be based on packet counter values. At 905, wireless audio device may set a nonce value such that an expected packet=s_bar(x+1) and a packet after the expected packet=s (x+2).

At 910, the wireless audio device may sniff a packet. At 915, the wireless audio device may determine whether a SEQN included in the packet received at 910 matches the expected SEQN (e.g., s_bar). If the SEQN does not match the expected SEQN, then the wireless audio device may determine whether there is an error (e.g., a CRC error or a MIC error) at 920. If there is an error, then the wireless audio device may set or reset the nonce values at 905. If there is no error, then at 925 the wireless audio device may process the packet. At 930, the wireless audio device may update the nonce values such that the expected packet=s(x+2), s_bar (x+3).

If, at 915, the wireless audio device determines that the SEQN does not equal the expected SEQN, then the wireless audio device may determine whether there is a CRC error. IF there is a CRC error, then at 970 the wireless audio device may send a NACK message to the source device, and set or reset the nonce values at 905. If there is no CRC error, then at 950 the wireless audio device may determine whether there is a MIC error with the packet received at 910. If there is no MIC error, then at 960, the wireless audio device may send an ACK message and process the packet received at 910. In some cases, the wireless audio device may set the nonce values such that expected packet=s(x), s_bar(x+1). If there is no MIC error at 950, then at 955, the wireless audio device may determine whether the packet is a retransmission based on hash octets (e.g., based on received hashes or hashes generated from CRC octets, MIC octets, or the like). If the packet is a retransmission at 940, then at 965 the wireless audio device may send an ACK message and discard the payload of the packet. If the packet is not a retransmission at 940, then at 935 the wireless audio device may send a NACK message. At 930, the wireless audio device may set its nonce values such that the expected packet=s(x+2), s_bar(x+3). In some examples, where the wireless audio device is a double nonce device, the wireless audio device may send the NACK message at 935, and then may set the nonce values at 905.

Figure 10:
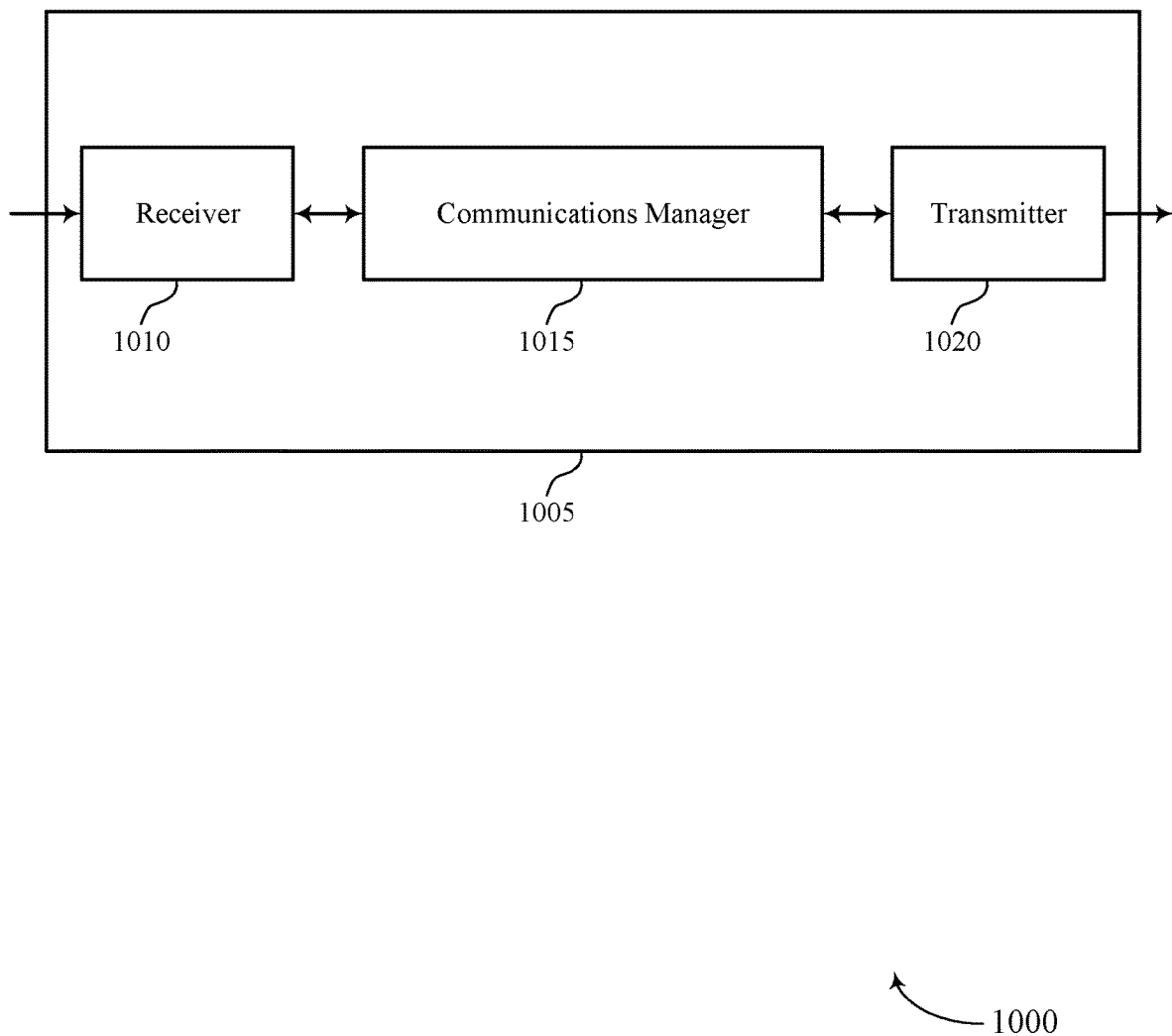
FIGS. 10 and 11 show block diagrams of devices that support retransmission and new packet detection in wireless systems in accordance with aspects of the present disclosure.

FIG. 10 shows a block diagram 1000 of a device 1005 that supports retransmission and new packet detection in wireless systems in accordance with aspects of the present disclosure. The device 1005 may be an example of aspects of a device as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to retransmission and new packet detection in wireless systems, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may sniff a first packet from a source device to a primary wireless audio device, the first packet including a first sequence number (SEQN) associated with the primary wireless audio device, receive a second packet from the source device to the primary wireless audio device, the second packet including a second SEQN associated with the secondary wireless audio device, increment a packet counter from a first packet counter value to a second packet counter value, based on sniffing the first packet, increment the packet counter, based on the ACK message, from the second packet counter value to a third packet counter value, and transmit to the source device, based on the second SEQN, an acknowledgment (ACK) message corresponding to the second packet. The communications manager 1015 may also receive a first link management protocol message from a source device to a primary wireless audio device, receive, from the primary wireless audio device, an indication that the primary wireless audio device has received the first link management protocol message from the source device, transmit, to the primary wireless audio device, a first acknowledgement message for the indication, receive, from the source device, a retransmission of the first link management protocol message, increment a packet counter based on the retransmission of the first link management protocol message, and transmit, to the source device, an acknowledgement message for the retransmission of the first link management protocol message. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
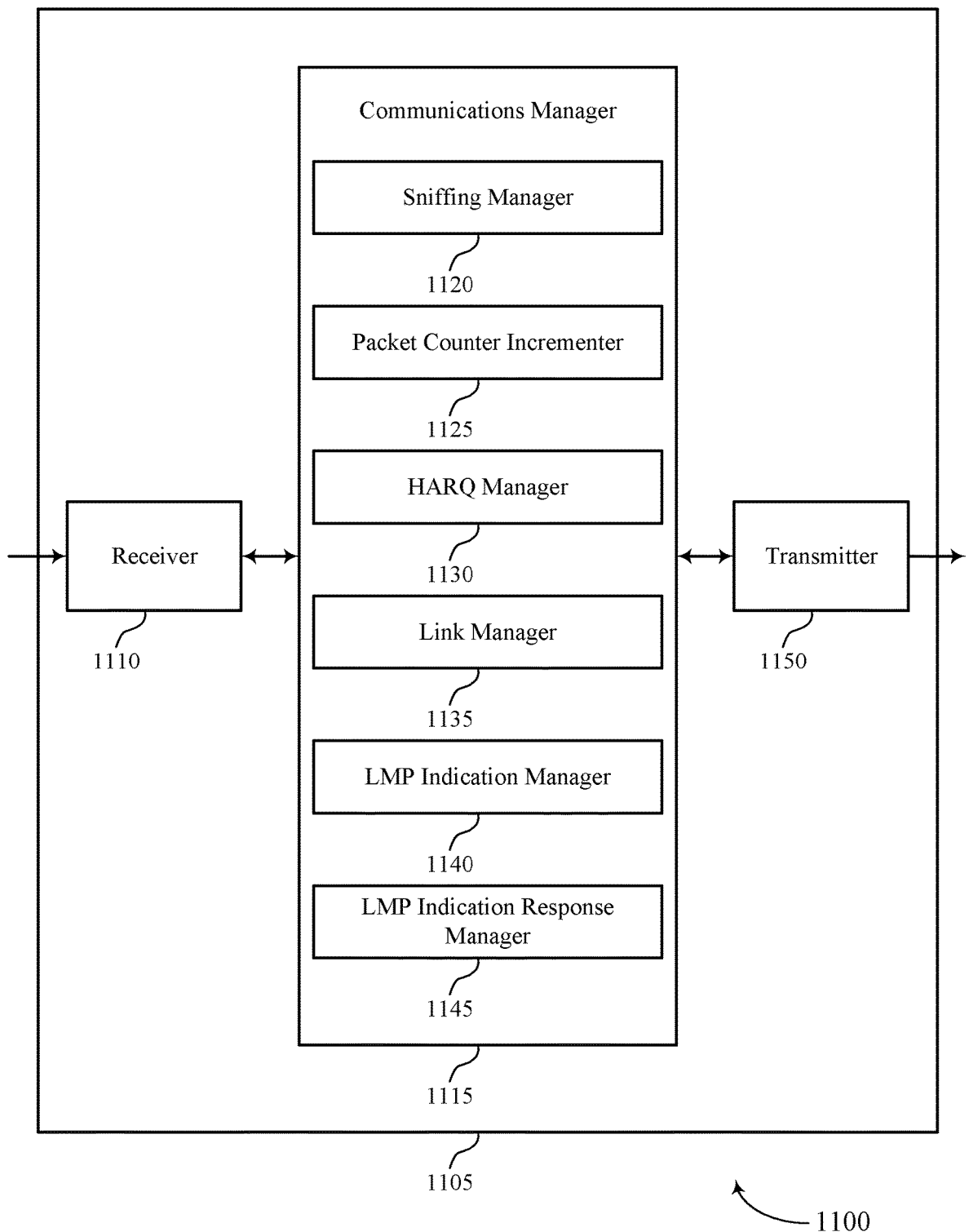

FIG. 11 shows a block diagram 1100 of a device 1105 that supports retransmission and new packet detection in wireless systems in accordance with aspects of the present disclosure. The device 1105 may be an example of aspects of a device 1005 or a wireless audio device 115 as described herein. The device 1105 may include a receiver 1110, a communications manager 1115, and a transmitter 1150. The device 1105 may also include a processor. Each of these components may be in communication with one another (e.g., via one or more buses).

The receiver 1110 may receive information such as packets, user data, or control information associated with various information channels (e.g., control channels, data channels, and information related to retransmission and new packet detection in wireless systems, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a sniffing manager 1120, a packet counter incrementer 1125, a HARQ manager 1130, a link manager 1135, a LMP indication manager 1140, and a LMP indication response manager 1145. The communications manager 1115 may be an example of aspects of the communications manager 1310 described herein.

The sniffing manager 1120 may sniff a first packet from a source device to a primary wireless audio device, the first packet including a first sequence number (SEQN) associated with the primary wireless audio device and receive a second packet from the source device to the primary wireless audio device, the second packet including a second SEQN associated with the secondary wireless audio device.

The packet counter incrementer 1125 may increment a packet counter from a first packet counter value to a second packet counter value, based on sniffing the first packet and increment the packet counter, based on the ACK message, from the second packet counter value to a third packet counter value.

The HARQ manager 1130 may transmit to the source device, based on the second SEQN, an acknowledgment (ACK) message corresponding to the second packet.

The link manager 1135 may receive a first link management protocol message from a source device to a primary wireless audio device.

The LMP indication manager 1140 may receive, from the primary wireless audio device, an indication that the primary wireless audio device has received the first link management protocol message from the source device.

The LMP indication response manager 1145 may transmit, to the primary wireless audio device, a first acknowledgement message for the indication.

The sniffing manager 1120 may receive, from the source device, a retransmission of the first link management protocol message.

The packet counter incrementer 1125 may increment a packet counter based on the retransmission of the first link management protocol message.

The HARQ manager 1130 may transmit, to the source device, an acknowledgement message for the retransmission of the first link management protocol message.

The transmitter 1150 may transmit signals generated by other components of the device 1105. In some examples, the transmitter 1150 may be collocated with a receiver 1110 in a transceiver module. For example, the transmitter 1150 may be an example of aspects of the transceiver 1320 described with reference to FIG. 13. The transmitter 1150 may utilize a single antenna or a set of antennas.

Figure 12:
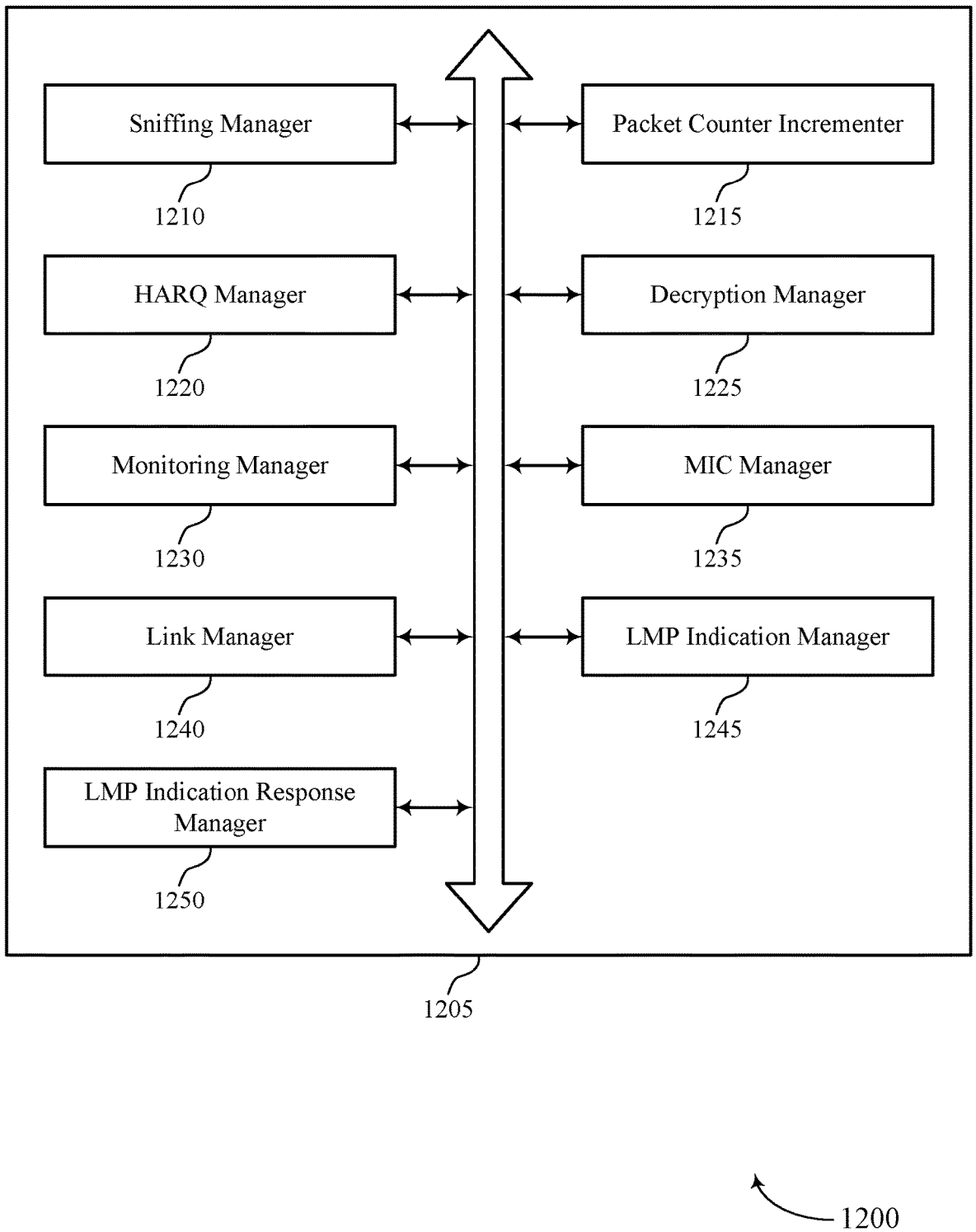
FIG. 12 shows a block diagram of a communications manager that supports retransmission and new packet detection in wireless systems in accordance with aspects of the present disclosure.

FIG. 12 shows a block diagram 1200 of a communications manager 1205 that supports retransmission and new packet detection in wireless systems in accordance with aspects of the present disclosure. The communications manager 1205 may be an example of aspects of a communications manager 1015, a communications manager 1115, or a communications manager 1310 described herein. The communications manager 1205 may include a sniffing manager 1210, a packet counter incrementer 1215, a HARQ manager 1220, a decryption manager 1225, a monitoring manager 1230, a MIC manager 1235, a link manager 1240, a LMP indication manager 1245, and a LMP indication response manager 1250. Each of these modules may communicate, directly or indirectly, with one another (e.g., via one or more buses).

The sniffing manager 1210 may sniff a first packet from a source device to a primary wireless audio device, the first packet including a first sequence number (SEQN) associated with the primary wireless audio device. In some examples, the sniffing manager 1210 may receive a second packet from the source device to the primary wireless audio device, the second packet including a second SEQN associated with the secondary wireless audio device. In some examples, the sniffing manager 1210 may receive, from the source device, a retransmission of the first link management protocol message.

In some examples, the sniffing manager 1210 may receive a fourth packet sent from the source device to the primary wireless audio device, the fourth packet having the second SEQN. In some examples, the sniffing manager 1210 may receive, based on the NACK message, a retransmission of the fourth packet, the fourth packet having the second SEQN. In some examples, the sniffing manager 1210 may receive a fourth packet sent from the source device to the primary wireless audio device, the fourth packet having the second SEQN. In some examples, the sniffing manager 1210 may sniff a fifth packet sent form the source device to the primary wireless audio device based on one of the fifth nonce value or the sixth nonce value. In some examples, the sniffing manager 1210 may receive, after the threshold amount of time has expired, a first retransmission of the second link management protocol message from the source device to the primary wireless audio device.

The packet counter incrementer 1215 may increment a packet counter from a first packet counter value to a second packet counter value, based on sniffing the first packet. In some examples, the packet counter incrementer 1215 may increment the packet counter, based on the ACK message, from the second packet counter value to a third packet counter value. In some examples, the packet counter incrementer 1215 may increment a packet counter based on the retransmission of the first link management protocol message. In some examples, the packet counter incrementer 1215 may increment the packet counter, based on the NACK message, from the third packet counter value to a fourth packet counter value.

In some examples, the packet counter incrementer 1215 may increment the packet counter, based on the ACK message, from the fourth packet counter value to a fifth packet counter value. In some examples, the packet counter incrementer 1215 may increment the packet counter, based on decrypting the fourth packet, from the third packet counter value to a fifth packet counter value. In some examples, the packet counter incrementer 1215 may increment the packet counter based on the first retransmission of the second link management protocol message. In some examples, the packet counter incrementer 1215 may refrain from incrementing the packet counter based on the second retransmission of the second link management protocol message.

The HARQ manager 1220 may transmit to the source device, based on the second SEQN, an acknowledgment (ACK) message corresponding to the second packet.

In some examples, the HARQ manager 1220 may transmit, to the source device, an acknowledgement message for the retransmission of the first link management protocol message. In some examples, the HARQ manager 1220 may transmit, based on the MIC error, a NACK message to the source device. In some examples, the HARQ manager 1220 may transmit, to the source device based on the second SEQN, an ACK message corresponding to the fourth packet. In some examples, the HARQ manager 1220 may transmit, to the source device, an acknowledgement message for the second retransmission of the second link management protocol message.

The link manager 1240 may receive a first link management protocol message from a source device to a primary wireless audio device. In some examples, the link manager 1240 may terminate communication with the source device based on the comparing and the determining. In some examples, the link manager 1240 may transmit, to the primary wireless audio device, a link termination message indicating the number of MIC errors for the data stream between the source device and the primary wireless audio device.

In some examples, the link manager 1240 may receive a second link management protocol message from the source device to the primary wireless audio device. In some examples, the link manager 1240 may receive, from the source device, a second retransmission of the second link management protocol message.

The LMP indication manager 1245 may receive, from the primary wireless audio device, an indication that the primary wireless audio device has received the first link management protocol message from the source device. In some examples, the LMP indication manager 1245 may receive, from the primary wireless audio device, an indication that the primary wireless audio device has received the retransmission of the second link management protocol message from the source device.

The LMP indication response manager 1250 may transmit, to the primary wireless audio device, a first acknowledgement message for the indication. In some examples, the LMP indication response manager 1250 may transmit, to the primary wireless audio device, a second acknowledgement message for the indication.

The decryption manager 1225 may decrypt the first packet based on the first packet counter value. In some examples, the decryption manager 1225 may decrypt the second packet based on the second packet counter value. In some examples, the decryption manager 1225 may decrypt the fourth packet based on the third packet counter value. In some examples, the decryption manager 1225 may decrypt the fourth packet based on the fourth packet counter value.

In some examples, the decryption manager 1225 may identify a first nonce value that is set based on the first packet counter value and a second nonce value based on the second packet counter value. In some examples, the decryption manager 1225 may decrypt the first packet using the first nonce value based on the first SEQN. In some examples, the decryption manager 1225 may identify, based on incrementing the packet counter from the first packet counter value to the second packet counter value, the second nonce value that is set based on the second packet counter value and a third nonce value that is set based on the third packet counter value.

In some examples, the decryption manager 1225 may decrypt the second packet using the second nonce value based on the second SEQN. In some examples, the decryption manager 1225 may identify, based on incrementing the packet counter from the second packet counter value to the third packet counter value, the third nonce value that is set based on the second packet counter value and a fourth nonce value that is set based on a fourth packet counter value. In some examples, the decryption manager 1225 may decrypt the fourth packet using the fourth nonce value based on the second SEQN. In some examples, the decryption manager 1225 may identify, based on incrementing the packet counter from the fourth packet counter value to the fifth packet counter value, a fifth nonce value set based on the fifth packet counter value, and a sixth nonce value that is set based on a sixth packet counter value.

The monitoring manager 1230 may monitor for a third packet sent from the source device to the primary wireless audio device, the third packet having the first SEQN. In some examples, the monitoring manager 1230 may determine, based on the monitoring, that the third packet has not been successfully sniffed by the secondary wireless audio device. In some examples, the monitoring manager 1230 may determine, based on the monitoring, that the third packet has not been successfully sniffed by the secondary wireless audio device. In some examples, the monitoring manager 1230 may monitor for a threshold amount of time for an indication that the primary wireless audio device has received the second link management protocol message from the source device.

The MIC manager 1235 may identify a message integrity check (MIC) error based on the decrypting. In some examples, the MIC manager 1235 may compare a number of message integrity check (MIC) errors for a data packet stream between the source device and the primary wireless audio device to a threshold number of MIC errors. In some examples, the MIC manager 1235 may determine, based on the comparing, that the number of MIC errors satisfies the threshold number of MIC errors.

Figure 13:
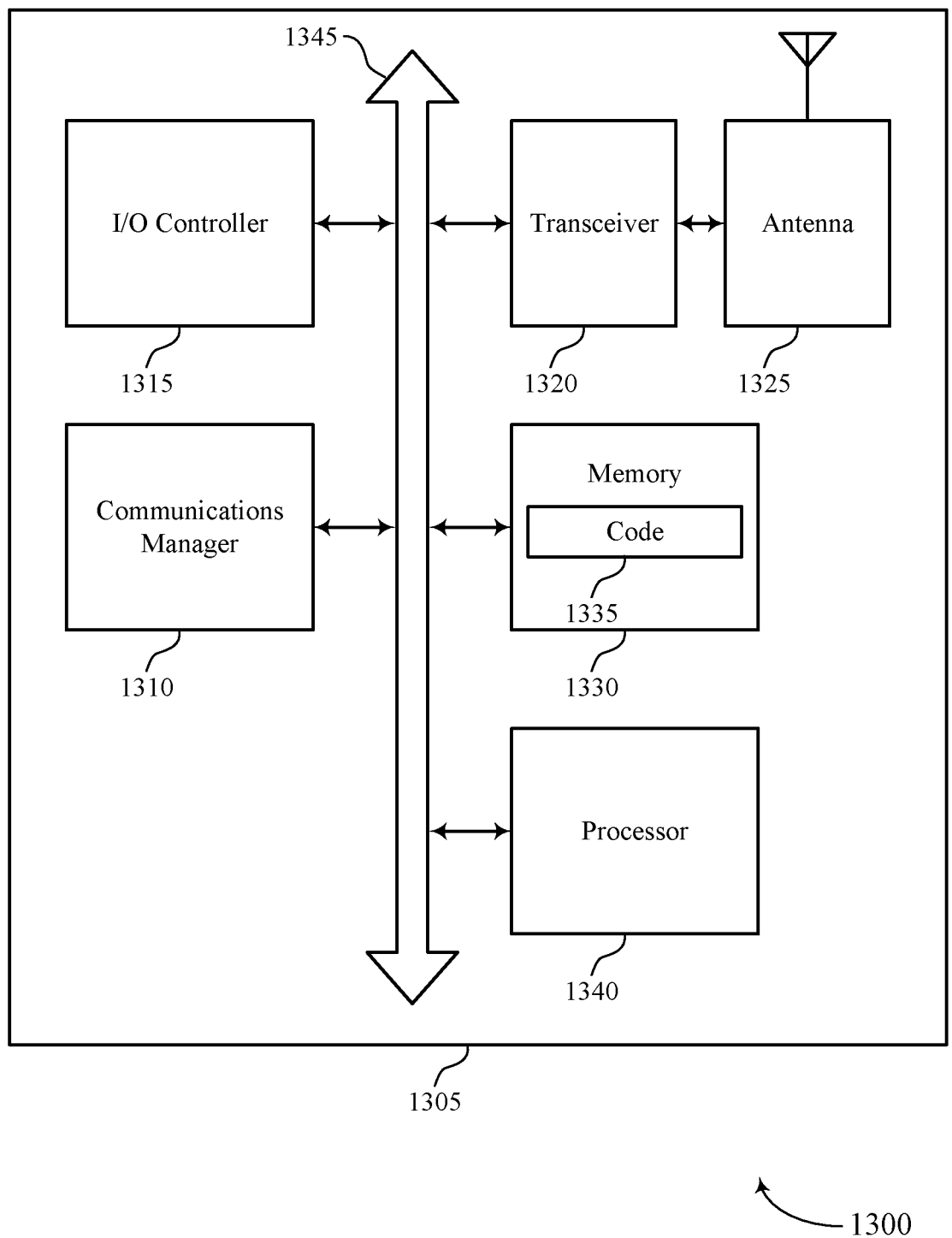
FIG. 13 shows a diagram of a system including a device that supports retransmission and new packet detection in wireless systems in accordance with aspects of the present disclosure.

FIG. 13 shows a diagram of a system 1300 including a device 1305 that supports retransmission and new packet detection in wireless systems in accordance with aspects of the present disclosure. The device 1305 may be an example of or include the components of device 1005, device 1105, or a device as described herein. The device 1305 may include components for bi-directional voice and data communications including components for transmitting and receiving communications, including a communications manager 1310, an I/O controller 1315, a transceiver 1320, an antenna 1325, memory 1330, and a processor 1340. These components may be in electronic communication via one or more buses (e.g., bus 1345).

The communications manager 1310 may sniff a first packet from a source device to a primary wireless audio device, the first packet including a first sequence number (SEQN) associated with the primary wireless audio device, receive a second packet from the source device to the primary wireless audio device, the second packet including a second SEQN associated with the secondary wireless audio device, increment a packet counter from a first packet counter value to a second packet counter value, based on sniffing the first packet, increment the packet counter, based on the ACK message, from the second packet counter value to a third packet counter value, and transmit to the source device, based on the second SEQN, an acknowledgment (ACK) message corresponding to the second packet. The communications manager 1310 may also receive a first link management protocol message from a source device to a primary wireless audio device, receive, from the primary wireless audio device, an indication that the primary wireless audio device has received the first link management protocol message from the source device, transmit, to the primary wireless audio device, a first acknowledgement message for the indication, receive, from the source device, a retransmission of the first link management protocol message, increment a packet counter based on the retransmission of the first link management protocol message, and transmit, to the source device, an acknowledgement message for the retransmission of the first link management protocol message.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless audio device may include a single antenna 1325. However, in some cases the device may have more than one antenna 1325, which may be capable of concurrently transmitting or receiving multiple wireless transmissions.

The memory 1330 may include RAM and ROM. The memory 1330 may store computer-readable, computer-executable code 1335 including instructions that, when executed, cause the processor to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting retransmission and new packet detection in wireless systems).

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
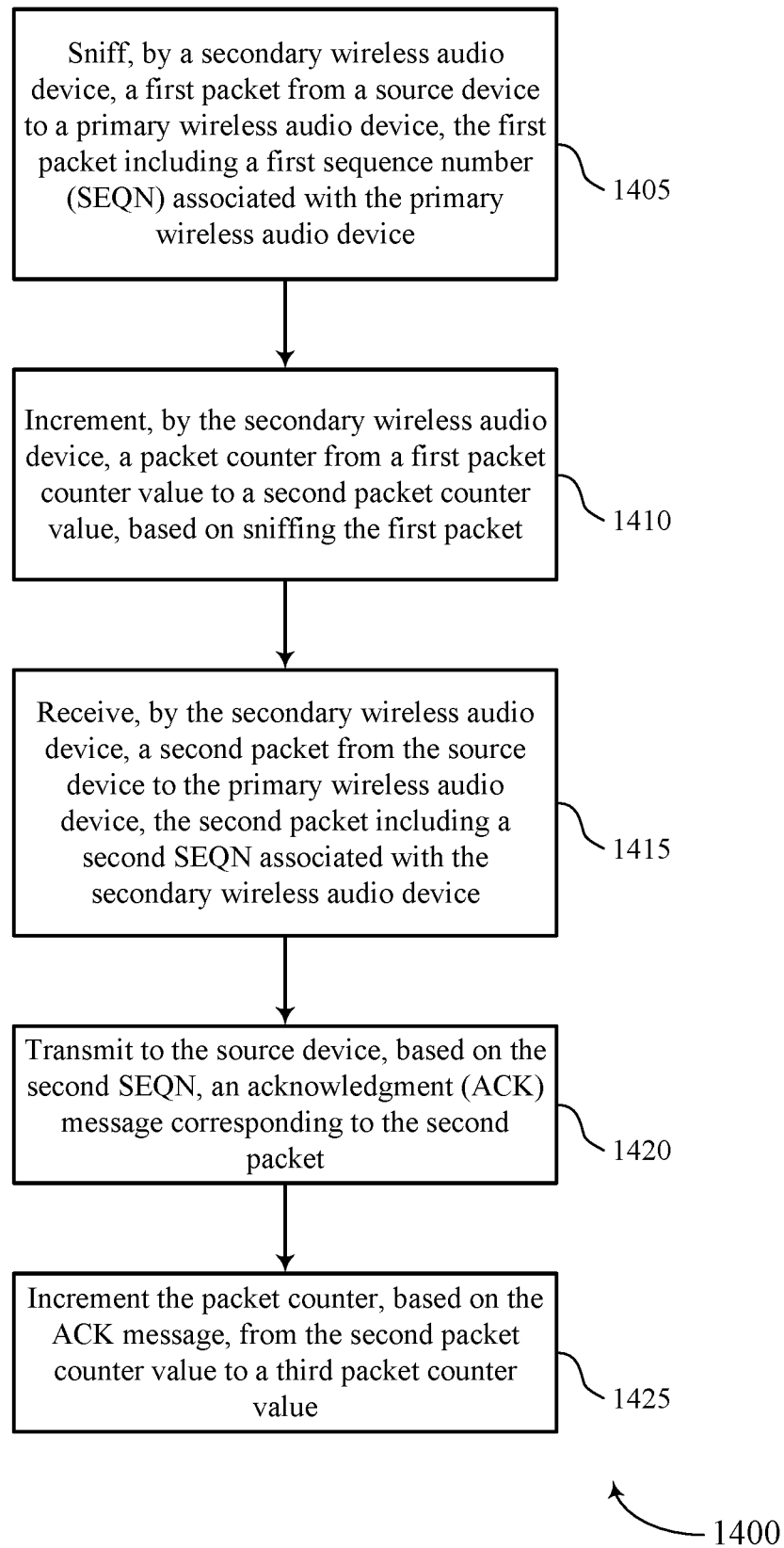
FIGS. 14 and 15 show flowcharts illustrating methods that support retransmission and new packet detection in wireless systems in accordance with aspects of the present disclosure.

FIG. 14 shows a flowchart illustrating a method 1400 that supports retransmission and new packet detection in wireless systems in accordance with aspects of the present disclosure. The operations of method 1400 may be implemented by a device or its components as described herein. For example, the operations of method 1400 may be performed by a communications manager as described with reference to FIGS. 10 through 13. In some examples, a device may execute a set of instructions to control the functional elements of the device to perform the functions described below. Additionally, or alternatively, a device may perform aspects of the functions described below using special-purpose hardware.

At 1405, the device may sniff a first packet from a source device to a primary wireless audio device, the first packet including a first sequence number (SEQN) associated with the primary wireless audio device. The operations of 1405 may be performed according to the methods described herein. In some examples, aspects of the operations of 1405 may be performed by a sniffing manager as described with reference to FIGS. 10 through 13.

At 1410, the device may increment a packet counter from a first packet counter value to a second packet counter value, based on sniffing the first packet. The operations of 1410 may be performed according to the methods described herein. In some examples, aspects of the operations of 1410 may be performed by a packet counter incrementer as described with reference to FIGS. 10 through 13.

At 1415, the device may receive a second packet from the source device to the primary wireless audio device, the second packet including a second SEQN associated with the secondary wireless audio device. The operations of 1415 may be performed according to the methods described herein. In some examples, aspects of the operations of 1415 may be performed by a sniffing manager as described with reference to FIGS. 10 through 13.

At 1420, the device may transmit to the source device, based on the second SEQN, an acknowledgment (ACK) message corresponding to the second packet. The operations of 1420 may be performed according to the methods described herein. In some examples, aspects of the operations of 1420 may be performed by a HARQ manager as described with reference to FIGS. 10 through 13.

At 1425, the device may increment the packet counter, based on the ACK message, from the second packet counter value to a third packet counter value. The operations of 1425 may be performed according to the methods described herein. In some examples, aspects of the operations of 1425 may be performed by a packet counter incrementer as described with reference to FIGS. 10 through 13.

Figure 15:
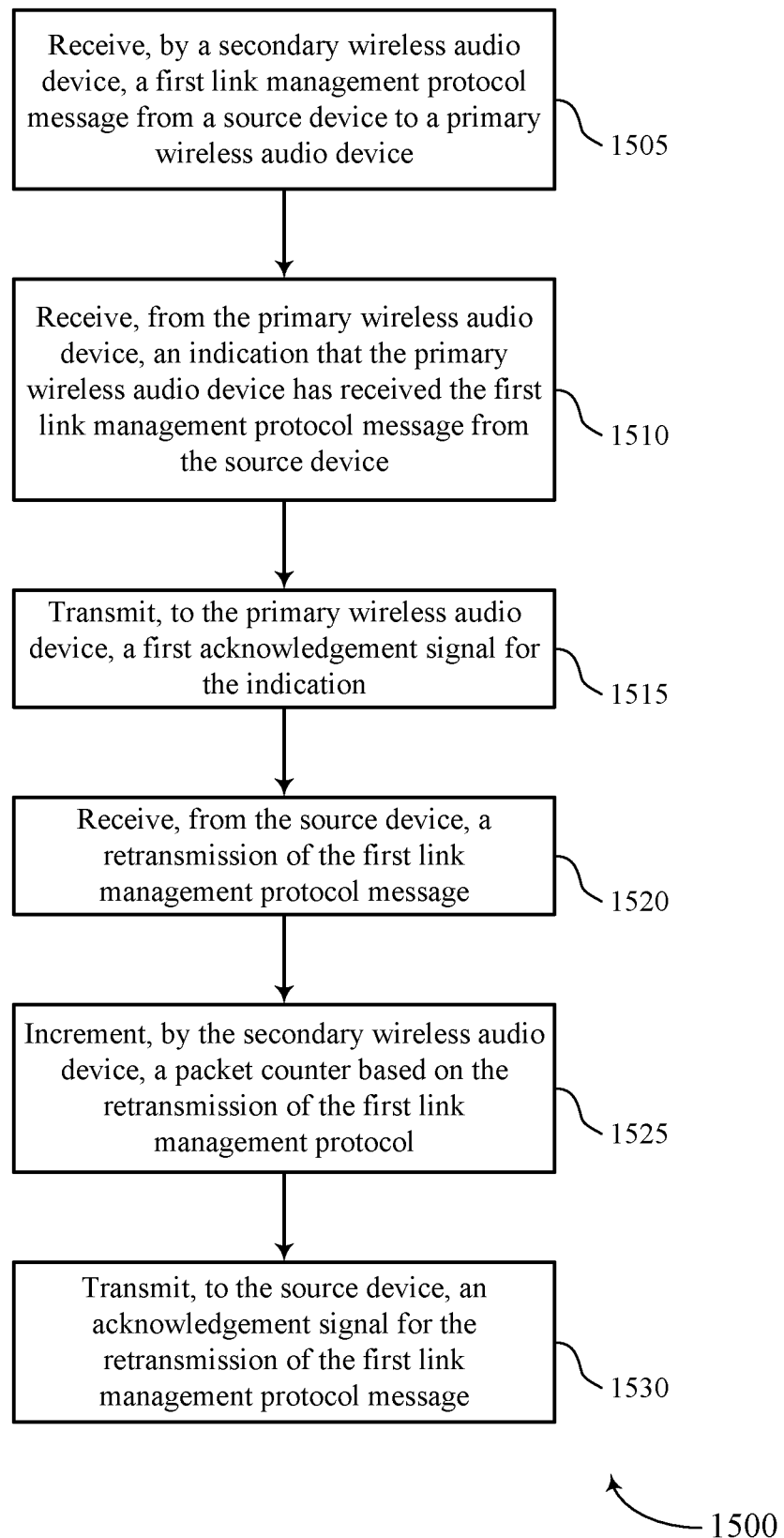

FIG. 15 shows a flowchart illustrating a method 1500 that supports retransmission and new packet detection in wireless systems in accordance with aspects of the present disclosure. The operations of method 1500 may be implemented by a device or its components as described herein. For example, the operations of method 1500 may be performed by a communications manager as described with reference to FIGS. 10 through 13. In some examples, a device may execute a set of instructions to control the functional elements of the device to perform the functions described below. Additionally, or alternatively, a device may perform aspects of the functions described below using special-purpose hardware.

At 1505, the device may receive a first link management protocol message from a source device to a primary wireless audio device. The operations of 1505 may be performed according to the methods described herein. In some examples, aspects of the operations of 1505 may be performed by a link manager as described with reference to FIGS. 10 through 13.

At 1510, the device may receive, from the primary wireless audio device, an indication that the primary wireless audio device has received the first link management protocol message from the source device. The operations of 1510 may be performed according to the methods described herein. In some examples, aspects of the operations of 1510 may be performed by an LMP indication manager as described with reference to FIGS. 10 through 13.

At 1515, the device may transmit, to the primary wireless audio device, a first acknowledgement message for the indication. The operations of 1515 may be performed according to the methods described herein. In some examples, aspects of the operations of 1515 may be performed by an LMP indication response manager as described with reference to FIGS. 10 through 13.

At 1520, the device may receive, from the source device, a retransmission of the first link management protocol message. The operations of 1520 may be performed according to the methods described herein. In some examples, aspects of the operations of 1520 may be performed by a sniffing manager as described with reference to FIGS. 10 through 13.

At 1525, the device may increment a packet counter based on the retransmission of the first link management protocol message. The operations of 1525 may be performed according to the methods described herein. In some examples, aspects of the operations of 1525 may be performed by a packet counter incrementer as described with reference to FIGS. 10 through 13.

At 1530, the device may transmit, to the source device, an acknowledgement message for the retransmission of the first link management protocol message. The operations of 1530 may be performed according to the methods described herein. In some examples, aspects of the operations of 1530 may be performed by a HARQ manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications comprising:
    sniffing, by a secondary wireless audio device, a first packet from a source device to a primary wireless audio device, the first packet comprising a first sequence number (SEQN) associated with the primary wireless audio device;
    incrementing, by the secondary wireless audio device, a packet counter from a first packet counter value to a second packet counter value, based at least in part on sniffing the first packet;
    receiving, by the secondary wireless audio device, a second packet from the source device to the primary wireless audio device, the second packet comprising a second SEQN associated with the secondary wireless audio device;
    transmitting to the source device, based at least in part on the second SEQN, an acknowledgment (ACK) message corresponding to the second packet; and
    incrementing the packet counter, based at least in part on the ACK message, from the second packet counter value to a third packet counter value.

2. The method of claim 1, further comprising:
    decrypting the first packet based at least in part on the first packet counter value; and
    decrypting the second packet based at least in part on the second packet counter value.

3. The method of claim 1, further comprising:
    monitoring for a third packet sent from the source device to the primary wireless audio device, the third packet having the first SEQN;
    determining, based at least in part on the monitoring, that the third packet has not been successfully sniffed by the secondary wireless audio device; and
    receiving a fourth packet sent from the source device to the primary wireless audio device, the fourth packet having the second SEQN.

4. The method of claim 3, further comprising:
    decrypting the fourth packet based at least in part on the third packet counter value;
    identifying a message integrity check (MIC) error based at least in part on the decrypting;

transmitting, based at least in part on the MIC error, a negative acknowledgement (NACK) message to the source device; and
incrementing the packet counter, based at least in part on the NACK message, from the third packet counter value to a fourth packet counter value.

5. The method of claim 4, further comprising:
receiving, based at least in part on the NACK message, a retransmission of the fourth packet, the fourth packet having the second SEQN;
decrypting the fourth packet based at least in part on the fourth packet counter value;
transmitting, to the source device based at least in part on the second SEQN, an ACK message corresponding to the fourth packet; and
incrementing the packet counter, based at least in part on the ACK message, from the fourth packet counter value to a fifth packet counter value.

6. The method of claim 1, wherein the secondary wireless audio device is a multi-nonce enabled device, further comprising:
identifying a first nonce value that is set based at least in part on the first packet counter value and a second nonce value based at least in part on the second packet counter value; and
decrypting the first packet using the first nonce value based at least in part on the first SEQN.

7. The method of claim 6, further comprising:
identifying, based at least in part on incrementing the packet counter from the first packet counter value to the second packet counter value, the second nonce value that is set based at least in part on the second packet counter value and a third nonce value that is set based at least in part on the third packet counter value;
decrypting the second packet using the second nonce value based at least in part on the second SEQN; and
identifying, based at least in part on incrementing the packet counter from the second packet counter value to the third packet counter value, the third nonce value that is set based at least in part on the second packet counter value and a fourth nonce value that is set based at least in part on a fourth packet counter value.

8. The method of claim 7, further comprising:
monitoring for a third packet sent from the source device to the primary wireless audio device, the third packet having the first SEQN;
determining, based at least in part on the monitoring, that the third packet has not been successfully sniffed by the secondary wireless audio device;
receiving a fourth packet sent from the source device to the primary wireless audio device, the fourth packet having the second SEQN; and
decrypting the fourth packet using the fourth nonce value based at least in part on the second SEQN.

9. The method of claim 8, further comprising:
incrementing the packet counter, based at least in part on decrypting the fourth packet, from the third packet counter value to a fifth packet counter value;
identifying, based at least in part on incrementing the packet counter from the fourth packet counter value to the fifth packet counter value, a fifth nonce value set based at least in part on the fifth packet counter value, and a sixth nonce value that is set based at least in part on a sixth packet counter value; and
sniffing a fifth packet sent form the source device to the primary wireless audio device based at least in part on one of the fifth nonce value or the sixth nonce value.

10. The method of claim 1, further comprising:
comparing, by the secondary wireless audio device, a number of message integrity check (MIC) errors for a data packet stream between the source device and the primary wireless audio device to a threshold number of MIC errors;
determining, based at least in part on the comparing, that the number of MIC errors satisfies the threshold number of MIC errors; and
terminating communication with the source device based at least in part on the comparing and the determining.

11. The method of claim 10, further comprising:
transmitting, to the primary wireless audio device, a link termination message indicating the number of MIC errors for the data packet stream between the source device and the primary wireless audio device.

12. A method for wireless communications comprising:
receiving, by a secondary wireless audio device, a first link management protocol message from a source device to a primary wireless audio device;
receiving, from the primary wireless audio device, an indication that the primary wireless audio device has received the first link management protocol message from the source device;
transmitting, to the primary wireless audio device, a first acknowledgement message for the indication;
receiving, from the source device, a retransmission of the first link management protocol message;
incrementing, by the secondary wireless audio device, a packet counter based at least in part on the retransmission of the first link management protocol message; and
transmitting, to the source device, an acknowledgement message for the retransmission of the first link management protocol message.

13. The method of claim 12, further comprising:
receiving a second link management protocol message from the source device to the primary wireless audio device;
monitoring for a threshold amount of time for an indication that the primary wireless audio device has received the second link management protocol message from the source device;
receiving, after the threshold amount of time has expired, a first retransmission of the second link management protocol message from the source device to the primary wireless audio device; and
incrementing, by the secondary wireless audio device, the packet counter based at least in part on the first retransmission of the second link management protocol message.

14. The method of claim 13, further comprising:
receiving, from the primary wireless audio device, an indication that the primary wireless audio device has received the retransmission of the second link management protocol message from the source device;
transmitting, to the primary wireless audio device, a second acknowledgement message for the indication;
receiving, from the source device, a second retransmission of the second link management protocol message;
refraining from incrementing the packet counter based at least in part on the second retransmission of the second link management protocol message; and
transmitting, to the source device, an acknowledgement message for the second retransmission of the second link management protocol message.

15. An apparatus for wireless communications comprising, comprising:

a processor, memory in electronic communication with the processor; and instructions stored in the memory and executable by the processor to cause the apparatus to:
- sniff, by a secondary wireless audio device, a first packet from a source device to a primary wireless audio device, the first packet comprising a first sequence number (SEQN) associated with the primary wireless audio device;
- increment, by the secondary wireless audio device, a packet counter from a first packet counter value to a second packet counter value, based at least in part on sniffing the first packet;
- receive, by the secondary wireless audio device, a second packet from the source device to the primary wireless audio device, the second packet comprising a second SEQN associated with the secondary wireless audio device;
- transmit to the source device, based at least in part on the second SEQN, an acknowledgment (ACK) message corresponding to the second packet; and
- increment the packet counter, based at least in part on the ACK message, from the second packet counter value to a third packet counter value.

16. The apparatus of claim 15, wherein the instructions are further executable by the processor to:
- decrypt the first packet based at least in part on the first packet counter value; and
- decrypt the second packet based at least in part on the second packet counter value.

17. The apparatus of claim 15, wherein the instructions are further executable by the processor to:
- monitor for a third packet sent from the source device to the primary wireless audio device, the third packet having the first SEQN;
- determine, based at least in part on the monitoring, that the third packet has not been successfully sniffed by the secondary wireless audio device; and
- receive a fourth packet sent from the source device to the primary wireless audio device, the fourth packet having the second SEQN.

18. The apparatus of claim 17, wherein the instructions are further executable by the processor to:
- decrypt the fourth packet based at least in part on the third packet counter value;
- identify a message integrity check (MIC) error based at least in part on the decrypting;
- transmit, based at least in part on the MIC error, a negative acknowledgement (NACK) message to the source device; and
- increment the packet counter, based at least in part on the NACK message, from the third packet counter value to a fourth packet counter value.

19. The apparatus of claim 18, wherein the instructions are further executable by the processor to:
- receiving, based at least in part on the NACK message, a retransmission of the fourth packet, the fourth packet having the second SEQN;
- decrypting the fourth packet based at least in part on the fourth packet counter value;
- transmitting, to the source device based at least in part on the second SEQN, an ACK message corresponding to the fourth packet; and
- incrementing the packet counter, based at least in part on the ACK message, from the fourth packet counter value to a fifth packet counter value.

20. The apparatus of claim 15, wherein the secondary wireless audio device is a multi-nonce enabled device, and wherein the instructions are further executable by the processor to:
- identify a first nonce value that is set based at least in part on the first packet counter value and a second nonce value based at least in part on the second packet counter value; and
- decrypt the first packet using the first nonce value based at least in part on the first SEQN.

* * * * *

UNITED STATES PATENT AND TRADEMARK OFFICE
CERTIFICATE OF CORRECTION

PATENT NO. : 10,880,045 B2  
APPLICATION NO. : 16/376795  
DATED : December 29, 2020  
INVENTOR(S) : Goyal et al.

Page 1 of 1

It is certified that error appears in the above-identified patent and that said Letters Patent is hereby corrected as shown below:

On the Title Page

Item (54) and Column 1, Line 1, should read:  
MECHANISM FOR EARBUDS TO SNIFF BREDR LINK WITH A PHONE Signed and Sealed this  
Sixteenth Day of February, 2021

Drew Hirshfeld  
*Performing the Functions and Duties of the*  
*Under Secretary of Commerce for Intellectual Property and*  
*Director of the United States Patent and Trademark Office*